(12) United States Patent
Chen et al.

(10) Patent No.: US 9,176,301 B1
(45) Date of Patent: Nov. 3, 2015

(54) IMAGING LENS, AND ELECTRONIC APPARATUS INCLUDING THE SAME

(71) Applicant: Genius Electronic Optical Co., Ltd., Taichung (TW)

(72) Inventors: Shih-Han Chen, Taichung (TW); Chung-Chih Chang, Taichung (TW); Hung-Chien Hsieh, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/458,591

(22) Filed: Aug. 13, 2014

(30) Foreign Application Priority Data

Apr. 18, 2014 (CN) .......................... 2014 1 0158325

(51) Int. Cl.

| | |
|---|---|
| *G02B 11/30* | (2006.01) |
| *G02B 13/00* | (2006.01) |
| *G02B 9/60* | (2006.01) |
| *G02B 1/04* | (2006.01) |
| *H04N 5/225* | (2006.01) |

(52) U.S. Cl.
CPC ............ *G02B 13/0015* (2013.01); *G02B 1/041* (2013.01); *G02B 9/60* (2013.01); *H04N 5/2254* (2013.01)

(58) Field of Classification Search
CPC .... G02B 13/0015; G02B 9/60; G02B 13/002; G02B 13/0045
See application file for complete search history.

(56) References Cited

U.S. PATENT DOCUMENTS

| | | | |
|---|---|---|---|
| 7,480,105 B2 | 1/2009 | Mori | |
| 7,486,449 B2 | 2/2009 | Miyano | |
| 7,639,432 B2 | 12/2009 | Asami | |
| 7,684,127 B2 | 3/2010 | Asami | |
| 2010/0254029 A1* | 10/2010 | Shinohara | ..................... 359/764 |
| 2013/0265651 A1 | 10/2013 | Ishizaka | |

FOREIGN PATENT DOCUMENTS

TW            201038966 A     11/2010

* cited by examiner

Primary Examiner — Joseph P Martinez
(74) Attorney, Agent, or Firm — Baker & McKenzie LLP

(57) ABSTRACT

An imaging lens includes first to fifth lens elements arranged from an object side to an image side in the given order. Through designs of surfaces of the lens elements and relevant lens parameters, a short system length of the imaging lens may be achieved while maintaining good optical performance.

16 Claims, 33 Drawing Sheets

| system focal length =3.436 mm, half field-of-view =41.91°, F-number=2.17, system length=4.387mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | -0.140 | | | |
| first lens element 3 | object-side surface 31 | 1.750 | 0.515 | 1.544 | 56.114 | 3.562 |
| | image-side surface 32 | 15.668 | 0.080 | | | |
| second lens element 4 | object-side surface 41 | 3.433 | 0.192 | 1.640 | 23.529 | -8.294 |
| | image-side surface 42 | 2.045 | 0.304 | | | |
| third lens element 5 | object-side surface 51 | 23.415 | 0.528 | 1.544 | 56.114 | 10.668 |
| | image-side surface 52 | -7.691 | 0.305 | | | |
| fourth lens element 6 | object-side surface 61 | -1.601 | 0.343 | 1.640 | 23.529 | -12.823 |
| | image-side surface 62 | -2.152 | 0.118 | | | |
| fifth lens element 7 | object-side surface 71 | 0.997 | 0.619 | 1.531 | 55.744 | 9.963 |
| | image-side surface 72 | 0.962 | 0.500 | | | |
| optical filter 8 | object-side surface 81 | ∞ | 0.210 | | | |
| | image-side surface 82 | ∞ | 0.674 | | | |
| image plane 100 | | ∞ | | | | |

FIG.3

| surface | K | a2 | a4 | a6 | a8 | a10 | a12 | a14 | a16 |
|---|---|---|---|---|---|---|---|---|---|
| 31 | -0.867499148 | 0 | -0.00348434 | 0.010724445 | -0.016136796 | -0.094269173 | 0.018492364 | 0.139304693 | -0.1290217 |
| 32 | 176.9363585 | 0 | -0.207661633 | 0.324371621 | -0.240585671 | -0.360586015 | 0.248191069 | 0.564361703 | -0.489929081 |
| 41 | 4.079949523 | 0 | -0.398472615 | 0.860861342 | -1.01297557 | 0.287406659 | 0.036940268 | 0.598039067 | -0.485138599 |
| 42 | 0.670273007 | 0 | -0.243010445 | 0.41844459 | -0.189090386 | -0.433500133 | 0.404938089 | 0.220196447 | -0.23247081 |
| 51 | 383.6799092 | 0 | 0.022034491 | -0.575859152 | 1.280552252 | -1.149802908 | 0.014278034 | 0.638355303 | -0.274431535 |
| 52 | -35.75800148 | 0 | 0.255618014 | -0.792348202 | 0.788809495 | -0.293580315 | -0.102314731 | 0.111741036 | -0.012156169 |
| 61 | -28.41238601 | 0 | 0.423488363 | -0.521147383 | 0.105807109 | 0.245346644 | -0.308924333 | 0.150996367 | -0.026274464 |
| 62 | -0.41751636 | 0 | 0.31745832 | -0.187376319 | -0.013881598 | 0.032630161 | 0.00094658 | -0.004296104 | 0.0006851 |
| 71 | -5.185587138 | 0 | -0.125568097 | 0.005599192 | 0.008232641 | -0.000317244 | -0.000670878 | 0.000151555 | -1.04688E-05 |
| 72 | -3.823737337 | 0 | -0.10051729 | 0.03115817 | -0.008112925 | 0.001553093 | -0.000245152 | 2.52884E-05 | -1.30772E-06 |

FIG.4

| system focal length =3.552 mm , half field-of-view =39.53°, F-number=2.26, system length=4.772mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | -0.119 | | | |
| first lens element 3 | object-side surface 31 | 2.027 | 0.315 | 1.544 | 56.114 | 4.371 |
| | image-side surface 32 | 12.699 | 0.080 | | | |
| second lens element 4 | object-side surface 41 | 1.677 | 0.194 | 1.640 | 23.529 | -14.305 |
| | image-side surface 42 | 1.354 | 0.279 | | | |
| third lens element 5 | object-side surface 51 | 15.375 | 1.184 | 1.544 | 56.114 | 5.264 |
| | image-side surface 52 | -3.439 | 0.189 | | | |
| fourth lens element 6 | object-side surface 61 | -1.326 | 0.232 | 1.640 | 23.529 | -4.046 |
| | image-side surface 62 | -2.881 | 0.135 | | | |
| fifth lens element 7 | object-side surface 71 | 1.049 | 0.786 | 1.531 | 55.744 | 6.170 |
| | image-side surface 72 | 1.139 | 0.500 | | | |
| optical filter 8 | object-side surface 81 | ∞ | 0.210 | | | |
| | image-side surface 82 | ∞ | 0.667 | | | |
| image plane 100 | | ∞ | | | | |

FIG.8

| surface | K | a2 | a4 | a6 | a8 | a10 | a12 | a14 | a16 |
|---|---|---|---|---|---|---|---|---|---|
| 31 | -0.500567345 | 0 | 0.006328384 | -0.007278025 | 0.026745318 | -0.068268637 | 0.003628791 | -0.006646411 | -0.066357938 |
| 32 | 182.2182431 | 0 | -0.193236649 | 0.410737277 | -0.448819203 | -0.099809632 | 0.23089307 | 0.145192963 | -0.263599242 |
| 41 | -0.616985864 | 0 | -0.417579978 | 0.695837353 | -0.8517664 | 0.330604245 | -0.14185581 | 0.444965419 | -0.256216906 |
| 42 | -0.689970394 | 0 | -0.28463185 | 0.321647869 | -0.155309542 | -0.384240437 | 0.400540943 | 0.102067178 | -0.15701051 |
| 51 | -39890.20442 | 0 | 0.078817917 | -0.356757377 | 0.861164007 | -0.87451382 | 0.131002784 | 0.379266162 | -0.193275357 |
| 52 | -10.03118834 | 0 | 0.358105624 | -0.810362441 | 0.744555637 | -0.269127147 | -0.083315882 | 0.105576534 | -0.024495329 |
| 61 | -26.55559587 | 0 | 0.468718273 | -0.575775859 | 0.1427031 | 0.245427426 | -0.313414349 | 0.152495332 | -0.02709186 |
| 62 | -0.040318242 | 0 | 0.304000901 | -0.189957046 | -0.00657014 | 0.032122071 | 9.43881E-05 | -0.004337201 | 0.000748865 |
| 71 | -8.550450853 | 0 | -0.112651364 | 0.006926204 | 0.008212178 | -0.00028732 | -0.000686156 | 0.000140252 | -8.21285E-06 |
| 72 | -4.482008386 | 0 | -0.078744139 | 0.027307832 | -0.008301671 | 0.001830255 | -0.000265483 | 2.0861E-05 | -6.55364E-07 |

FIG.9

| system focal length =3.460 mm, half field-of-view =40.00°, F-number=2.24, system length=4.461mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | -0.140 | | | |
| first lens element 3 | object-side surface 31 | 1.737 | 0.492 | 1.544 | 56.114 | 3.511 |
| | image-side surface 32 | 16.697 | 0.069 | | | |
| second lens element 4 | object-side surface 41 | 4.666 | 0.246 | 1.640 | 23.529 | -8.687 |
| | image-side surface 42 | 2.492 | 0.394 | | | |
| third lens element 5 | object-side surface 51 | 22.837 | 0.301 | 1.544 | 56.114 | 11.345 |
| | image-side surface 52 | -8.459 | 0.376 | | | |
| fourth lens element 6 | object-side surface 61 | -0.971 | 0.252 | 1.640 | 23.529 | -4.391 |
| | image-side surface 62 | -1.628 | 0.071 | | | |
| fifth lens element 7 | object-side surface 71 | 0.975 | 0.911 | 1.531 | 55.744 | 3.917 |
| | image-side surface 72 | 1.235 | 0.500 | | | |
| optical filter 8 | object-side surface 81 | ∞ | 0.210 | | | |
| | image-side surface 82 | ∞ | 0.638 | | | |
| image plane 100 | | | | | | |

FIG.12

| surface | K | a2 | a4 | a6 | a8 | a10 | a12 | a14 | a16 |
|---|---|---|---|---|---|---|---|---|---|
| 31 | -0.898022034 | 0 | -0.006484693 | 0.05602697 | -0.071051514 | -0.091483168 | 0.056396626 | 0.111278283 | -0.156974917 |
| 32 | 0 | 0 | -0.224965078 | 0.395839056 | -0.379498106 | -0.388053834 | 0.385266788 | 0.668624368 | -0.692018295 |
| 41 | 0 | 0 | -0.375808939 | 0.819046613 | -1.073303675 | 0.327224616 | 0.127657313 | 0.637898303 | -0.624648743 |
| 42 | 1.074548265 | 0 | -0.193775618 | 0.3048701 | -0.130941472 | -0.382726975 | 0.390626178 | 0.173538677 | -0.229763642 |
| 51 | 0 | 0 | 0.009580323 | -0.654947998 | 1.329614931 | -1.126417545 | 0.017982748 | 0.628611248 | -0.278604517 |
| 52 | 0 | 0 | 0.212024189 | -0.765495683 | 0.803218508 | -0.316420916 | -0.09749796 | 0.133446577 | -0.016491609 |
| 61 | -11.22267182 | 0 | 0.414578645 | -0.486825809 | 0.095281928 | 0.248275814 | -0.300931038 | 0.151121325 | -0.029676288 |
| 62 | -0.901707617 | 0 | 0.322743001 | -0.18475447 | -0.001471653 | 0.031837553 | -0.000834326 | -0.004670858 | 0.000870264 |
| 71 | -8.332801104 | 0 | -0.109960422 | 0.005781368 | 0.008113822 | -0.000318962 | -0.000686175 | 0.000147466 | -9.33962E-06 |
| 72 | -5.042790327 | 0 | -0.075357552 | 0.024191666 | -0.007659379 | 0.001709831 | -0.000260019 | 2.27306E-05 | -9.17358E-07 |

FIG.13

| system focal length =3.446 mm, half field-of-view =40.28°, F-number=2.21, system length=4.332mm | | | | | |
|---|---|---|---|---|---|
| lens element | surface | radius of curvature | thickness | refractive index | Abbe number | focal length |
| object | | ∞ | ∞ | | | |
| aperture stop 2 | | ∞ | -0.140 | | | |
| first lens element 3 | object-side surface 31 | 1.670 | 0.497 | 1.544 | 56.114 | 3.549 |
| | image-side surface 32 | 10.838 | 0.076 | | | |
| second lens element 4 | object-side surface 41 | 3.756 | 0.243 | 1.640 | 23.529 | -8.520 |
| | image-side surface 42 | 2.174 | 0.384 | | | |
| third lens element 5 | object-side surface 51 | 32.737 | 0.355 | 1.544 | 56.114 | 9.241 |
| | image-side surface 52 | -5.941 | 0.349 | | | |
| fourth lens element 6 | object-side surface 61 | -1.231 | 0.280 | 1.640 | 23.529 | -10.841 |
| | image-side surface 62 | -1.628 | 0.159 | | | |
| fifth lens element 7 | object-side surface 71 | 1.015 | 0.641 | 1.531 | 55.744 | 11.327 |
| | image-side surface 72 | 0.953 | 0.500 | | | |
| optical filter 8 | object-side surface 81 | ∞ | 0.210 | | | |
| | image-side surface 82 | ∞ | 0.638 | | | |
| image plane 100 | | ∞ | | | | |

FIG.16

| surface | K | a2 | a4 | a6 | a8 | a10 | a12 | a14 | a16 |
|---|---|---|---|---|---|---|---|---|---|
| 31 | -0.756372207 | 0 | -0.000047931 | 0.012491594 | 0.004072942 | -0.084055898 | -0.024446327 | 0.051627852 | -0.031513893 |
| 32 | 0 | 0 | -0.255144243 | 0.411160613 | -0.311594746 | -0.431974225 | 0.306142658 | 0.679695935 | -0.60473822 |
| 41 | 0 | 0 | -0.438732208 | 0.898472041 | -1.059314477 | 0.299192116 | 0.069834946 | 0.601845811 | -0.510562081 |
| 42 | 0.63987965 | 0 | -0.231140913 | 0.367326685 | -0.124026255 | -0.42023456 | 0.364416548 | 0.190251128 | -0.201350301 |
| 51 | 0 | 0 | 0.011212047 | -0.624198132 | 1.299459219 | -1.144066153 | 0.023348022 | 0.64450672 | -0.280191459 |
| 52 | 0 | 0 | 0.234438978 | -0.799915195 | 0.815910308 | -0.31494852 | -0.1135339 | 0.123535249 | -0.001318366 |
| 61 | -15.07054050 | 0 | 0.454895787 | -0.555285927 | 0.123933607 | 0.251284825 | -0.3153335675 | 0.148034934 | -0.024307112 |
| 62 | -3.693311111 | 0 | 0.321005634 | -0.211659412 | -0.006392968 | 0.03343772 | 0.000377516 | -0.004492155 | 0.000751247 |
| 71 | -6.845164773 | 0 | -0.118605195 | 0.008370532 | 0.007725145 | -0.000364522 | -0.000673193 | 0.000151226 | -9.94717E-06 |
| 72 | -4.796019671 | 0 | -0.086969006 | 0.027004097 | -0.008349346 | 0.001873303 | -0.000272651 | 2.00422E-05 | -4.83613E-07 |

FIG.17

FIG.20 system focal length =3.419 mm, half field-of-view =40.38°, F-number=2.26, system length=4.460mm

| lens element | surface | radius of curvature | thickness | refractive index | Abbe number | focal length |
|---|---|---|---|---|---|---|
| object | | ∞ | ∞ | | | |
| aperture stop 2 | | ∞ | -0.140 | | | |
| first lens element 3 | object-side surface 31 | 1.641 | 0.506 | 1.544 | 56.114 | 3.671 |
| | image-side surface 32 | 8.081 | 0.075 | | | |
| second lens element 4 | object-side surface 41 | 4.286 | 0.290 | 1.640 | 23.529 | -7.255 |
| | image-side surface 42 | 2.177 | 0.185 | | | |
| third lens element 5 | object-side surface 51 | 5.041 | 0.318 | 1.544 | 56.114 | 7.127 |
| | image-side surface 52 | -16.673 | 0.415 | | | |
| fourth lens element 6 | object-side surface 61 | -0.985 | 0.250 | 1.640 | 23.529 | -4.023 |
| | image-side surface 62 | -1.747 | 0.065 | | | |
| fifth lens element 7 | object-side surface 71 | 1.121 | 1.079 | 1.531 | 55.744 | 3.846 |
| | image-side surface 72 | 1.647 | 0.500 | | | |
| optical filter 8 | object-side surface 81 | ∞ | 0.210 | | | |
| | image-side surface 82 | ∞ | 0.568 | | | |
| image plane 100 | | ∞ | | | | |

| surface | K | a2 | a4 | a6 | a8 | a10 | a12 | a14 | a16 |
|---|---|---|---|---|---|---|---|---|---|
| 31 | -0.860703294 | 0 | -0.003420924 | 0.017757275 | -0.017082018 | -0.082605539 | 0.008111342 | 0.07718331 | -0.105124179 |
| 32 | 17.86082409 | 0 | -0.265004313 | 0.392483141 | -0.30089638 | -0.420080438 | 0.299868131 | 0.66015784 | -0.612111939 |
| 41 | 3.759719476 | 0 | -0.4173524 | 0.89138266 | -1.077800753 | 0.297639569 | 0.083811859 | 0.610715405 | -0.535342113 |
| 42 | 0.268815871 | 0 | -0.247001733 | 0.392234626 | -0.123513599 | -0.443536017 | 0.34397125 | 0.186466177 | -0.185494565 |
| 51 | 2.287791028 | 0 | 0.000674749 | -0.59297701 | 1.303336628 | -1.149377758 | 0.020264034 | 0.643896245 | -0.280651129 |
| 52 | 67.99453808 | 0 | 0.228849819 | -0.70312323 | 0.779933052 | -0.339164099 | -0.11436068 | 0.132724935 | 0.017846645 |
| 61 | -9.801628107 | 0 | 0.29747839 | -0.344954178 | 0.034022211 | 0.177755508 | -0.284284618 | 0.178502511 | -0.060204161 |
| 62 | -0.185640811 | 0 | 0.262385341 | -0.141948294 | -4.75766E-05 | 0.015113181 | -0.006351377 | -0.003448018 | 0.003313456 |
| 71 | -10.54127059 | 0 | -0.097440489 | 0.003411753 | 0.007299733 | -0.000250378 | -0.000639775 | 0.000153664 | -1.16012E-05 |
| 72 | -5.437078656 | 0 | -0.068714132 | 0.022491475 | -0.007960682 | 0.001869531 | -0.000266282 | 2.10702E-05 | -8.22322E-07 |

FIG.21

FIG.24 system focal length =3.436 mm, half field-of-view =40.53°, F-number=2.25, system length=4.487mm

| lens element | surface | radius of curvature | thickness | refractive index | Abbe number | focal length |
|---|---|---|---|---|---|---|
| object | | ∞ | ∞ | | | |
| aperture stop 2 | | ∞ | -0.117 | | | |
| first lens element 3 | object-side surface 31 | 1.753 | 0.365 | 1.544 | 56.114 | 3.834 |
| | image-side surface 32 | 9.987 | 0.075 | | | |
| second lens element 4 | object-side surface 41 | 3.696 | 0.244 | 1.640 | 23.529 | -9.167 |
| | image-side surface 42 | 2.215 | 0.336 | | | |
| third lens element 5 | object-side surface 51 | 10.664 | 0.370 | 1.544 | 56.114 | 10.348 |
| | image-side surface 52 | -11.866 | 0.382 | | | |
| fourth lens element 6 | object-side surface 61 | -0.956 | 0.283 | 1.640 | 23.529 | -3.840 |
| | image-side surface 62 | -1.738 | 0.042 | | | |
| fifth lens element 7 | object-side surface 71 | 0.927 | 1.042 | 1.531 | 55.744 | 3.232 |
| | image-side surface 72 | 1.223 | 0.500 | | | |
| optical filter 8 | object-side surface 81 | ∞ | 0.210 | | | |
| | image-side surface 82 | ∞ | 0.638 | | | |
| image plane 100 | | | | | | |

| surface | K | a2 | a4 | a6 | a8 | a10 | a12 | a14 | a16 |
|---|---|---|---|---|---|---|---|---|---|
| 31 | -0.808356126 | 0 | 0.002280204 | 0.001734232 | -0.005571285 | -0.083981905 | -0.027214383 | 0.06244942 | -0.101664361 |
| 32 | 50.91696317 | 0 | -0.251035168 | 0.440606692 | -0.351855884 | -0.398432987 | 0.286487224 | 0.600203278 | -0.563582621 |
| 41 | -0.747066862 | 0 | -0.404866743 | 0.875966468 | -1.020159865 | 0.291842021 | 0.052343232 | 0.574682772 | -0.470030635 |
| 42 | -0.244999876 | 0 | -0.220043509 | 0.340330124 | -0.097932111 | -0.422779111 | 0.342502992 | 0.195093267 | -0.196577181 |
| 51 | -100.5192249 | 0 | 0.013030865 | -0.610836014 | 1.278177979 | -1.130726394 | 0.020250695 | 0.646578151 | -0.283825564 |
| 52 | 30.37762307 | 0 | 0.231850182 | -0.783961635 | 0.814479695 | -0.330679399 | -0.106358308 | 0.132237189 | -0.009573263 |
| 61 | -13.13131464 | 0 | 0.471202663 | -0.562801723 | 0.125843629 | 0.253070352 | -0.321802767 | 0.156303915 | -0.026989881 |
| 62 | -1.797653042 | 0 | 0.327581369 | -0.206879701 | -0.005810307 | 0.033419481 | 0.000304083 | -0.004452256 | 0.0007658441 |
| 71 | -9.106284092 | 0 | -0.104948773 | 0.007820492 | 0.007713621 | -0.000352592 | -0.000658325 | 0.000147414 | -9.71509E-06 |
| 72 | -5.51744712 | 0 | -0.075645079 | 0.027091686 | -0.008482068 | 0.001891164 | -0.00026876 | 1.99382E-05 | -4.73045E-07 |

FIG.25 system focal length =3.383 mm, half field-of-view =42.04°, F-number=2.21, system length=4.229mm

| lens element | surface | radius of curvature | thickness | refractive index | Abbe number | focal length |
|---|---|---|---|---|---|---|
| object | | ∞ | ∞ | | | |
| aperture stop 2 | | ∞ | -0.166 | | | |
| first lens element 3 | object-side surface 31 | 1.643 | 0.433 | 1.544 | 56.114 | 3.681 |
| | image-side surface 32 | 8.178 | 0.095 | | | |
| second lens element 4 | object-side surface 41 | 4.235 | 0.189 | 1.640 | 23.529 | -8.025 |
| | image-side surface 42 | 2.288 | 0.334 | | | |
| third lens element 5 | object-side surface 51 | 9.653 | 0.314 | 1.544 | 56.114 | 8.817 |
| | image-side surface 52 | -9.490 | 0.344 | | | |
| fourth lens element 6 | object-side surface 61 | -1.042 | 0.163 | 1.640 | 23.529 | -4.515 |
| | image-side surface 62 | -1.723 | 0.149 | | | |
| fifth lens element 7 | object-side surface 71 | 0.920 | 0.730 | 1.531 | 55.744 | 3.801 |
| | image-side surface 72 | 1.221 | 0.500 | | | |
| optical filter 8 | object-side surface 81 | ∞ | 0.210 | | | |
| | image-side surface 82 | ∞ | 0.770 | | | |
| image plane 100 | | ∞ | | | | |

FIG.28

| surface | K | a2 | a4 | a6 | a8 | a10 | a12 | a14 | a16 |
|---|---|---|---|---|---|---|---|---|---|
| 31 | -0.768753385 | 0 | -0.001119773 | 0.002750486 | 0.003940024 | -0.081435189 | -0.026110582 | 0.041653926 | -0.055818217 |
| 32 | 40.25654586 | 0 | -0.237362796 | 0.380719439 | -0.315908318 | -0.415973234 | 0.312288504 | 0.673630608 | -0.627482785 |
| 41 | 0.100041155 | 0 | -0.418196939 | 0.903332291 | -1.046147544 | 0.304263172 | 0.072376642 | 0.602164145 | -0.507161084 |
| 42 | 0.232106047 | 0 | -0.242785102 | 0.406783105 | -0.127201574 | -0.431918251 | 0.358537704 | 0.194319459 | -0.188097181 |
| 51 | -3.590763916 | 0 | 0.00881261 | -0.620484003 | 1.300744516 | -1.144362994 | 0.023131309 | 0.643720217 | -0.277705487 |
| 52 | 57.02256396 | 0 | 0.238773309 | -0.789553157 | 0.817518714 | -0.314704189 | -0.111419462 | 0.125533879 | 0.002735599 |
| 61 | -12.02870962 | 0 | 0.470156239 | -0.558802157 | 0.125727179 | 0.253360353 | -0.314140516 | 0.147981438 | -0.025395574 |
| 62 | -2.397157956 | 0 | 0.324386027 | -0.206356805 | -0.005307576 | 0.033584358 | 0.000440429 | -0.004567111 | 0.000649034 |
| 71 | -6.889403867 | 0 | -0.114616256 | 0.008596655 | 0.007718331 | -0.000364897 | -0.000675778 | 0.000150896 | -9.81595E-06 |
| 72 | -4.634161376 | 0 | -0.087233398 | 0.028113356 | -0.008484267 | 0.001850138 | -0.000273624 | 2.03113E-05 | -3.80091E-07 |

FIG.29

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| G34/G23 | 1.003 | 0.677 | 0.954 | 0.909 | 2.247 | 1.135 | 1.032 |
| ALT/T4 | 6.405 | 11.685 | 8.738 | 7.200 | 9.777 | 8.150 | 11.236 |
| T1/(G12+G45) | 2.601 | 1.465 | 3.514 | 2.115 | 3.620 | 3.137 | 1.779 |
| ALT/G23 | 7.227 | 9.717 | 5.589 | 5.250 | 13.236 | 6.850 | 5.481 |
| G34/(G12+G45) | 1.540 | 0.879 | 2.686 | 1.485 | 2.968 | 3.278 | 1.414 |
| (T1+T5)/T4 | 3.306 | 4.746 | 5.567 | 4.064 | 6.342 | 4.977 | 7.148 |
| T5/G23 | 2.036 | 2.817 | 2.312 | 1.669 | 5.846 | 3.097 | 2.189 |
| G34/(G12+G45) | 1.540 | 0.879 | 2.686 | 1.485 | 2.968 | 3.278 | 1.414 |
| T5/(G12+G45) | 3.126 | 3.656 | 6.507 | 2.728 | 7.720 | 8.942 | 2.999 |
| T5/T4 | 1.805 | 3.388 | 3.615 | 2.289 | 4.318 | 3.684 | 4.486 |
| T3/(G12+G45) | 2.667 | 5.507 | 2.150 | 1.511 | 2.277 | 3.180 | 1.289 |
| ALT/(G12+G45) | 11.096 | 12.609 | 15.729 | 8.579 | 17.480 | 19.780 | 7.511 |

FIG.31

IMAGING LENS, AND ELECTRONIC APPARATUS INCLUDING THE SAME

CROSS-REFERENCE TO RELATED APPLICATION

This application claims priority of Chinese Patent Application No. 201410158325.2, filed on Apr. 18, 2014.

BACKGROUND OF THE INVENTION

1. Field of the Invention

The invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. Pat. Nos. 7,480,105, 7,639,432, 7,486,449 and 7,684,127 discloses a conventional imaging lens that includes five lens elements. In U.S. Pat. Nos. 7,480,105 and 7,639,432, the refractive power of the first two lens elements has a negative-positive configuration, whereas in U.S. Pat. Nos. 7,486,449 and 7,684,127, a negative-negative configuration is found. However, these configurations may not achieve good optical properties, and the length of the conventional imaging lens of each of the aforementioned Patent cases is 10 mm~18 mm, which renders the same unsuitable to be incorporated into a mobile phone, a digital camera and/or other portable electronic devices with a thin design.

Enlarging the field of view and reducing the system length of the imaging lens while maintaining satisfactory optical performance are always a goal in the industry.

SUMMARY OF THE INVENTION

Therefore, the object of the present invention is to provide an imaging lens having a shorter overall length while maintaining good optical performance.

According to one aspect of the present invention, there is provided an imaging lens including a first lens element, a second lens element, a third lens element, a fourth lens element and a fifth lens element arranged in order from an object side to an image side along an optical axis of said imaging lens. Each of the first lens element, the second lens element, the third lens element, the fourth lens element and the fifth lens element has a refractive power, an object-side surface facing toward the object side, and an image-side surface facing toward the image side.

The object-side surface of the first lens element is a convex surface, and has a convex portion in a vicinity of the optical axis, and a convex portion in a vicinity of a periphery of said first lens element. The image-side surface of the second lens element is a concave surface, and has a concave portion in a vicinity of the optical axis, and a concave portion in a vicinity of a periphery of said second lens element. The third lens element is made of a plastic material. The object-side surface of the fourth lens element has a sag value of Sag_r0 at the optical axis, a sag value of Sag_r1 at a surface point thereof corresponding to a distance of ⅓ of an effective optical radius thereof from the optical axis in a radially outward direction, a sag value of Sag_r2 at a surface point thereof corresponding to a distance of ⅔ of the effective optical radius thereof from the optical axis in the radially outward direction, and a sag value of Sag_r3 at a surface point thereof corresponding to a distance of the effective optical radius thereof from the optical axis in the radially outward direction. The object-side surface of the fourth lens element satisfies:

$|Sag\_r1 - Sag\_r0| > |Sag\_r2 - Sag\_r1|$ and $|Sag\_r3 - Sag\_r2| > |Sag\_r2 - Sag\_r1|$.

The image-side surface of the fifth lens element has a concave portion in a vicinity of the optical axis, and a convex portion in a vicinity of a periphery of the fifth lens element. The imaging lens does not include any lens element with refractive power other than the first lens element, the second lens element, the third lens element, the fourth lens element and the fifth lens element.

Another object of the present invention is to provide an electronic apparatus including an imaging lens with five lens elements.

According to another aspect of the present invention, there is provided an electronic apparatus including a housing and an imaging module. The imaging module is disposed in the housing, and includes the imaging lens of this invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical data corresponding to the imaging lens of the first preferred embodiment;

FIG. 4 shows values of some aspherical coefficients corresponding to the imaging lens of the first preferred embodiment;

FIG. 8 shows values of some optical data corresponding to the imaging lens of the second preferred embodiment;

FIG. 9 shows values of some aspherical coefficients corresponding to the imaging lens of the second preferred embodiment;

FIG. 12 shows values of some optical data corresponding to the imaging lens of the third preferred embodiment;

FIG. 13 shows values of some aspherical coefficients corresponding to the imaging lens of the third preferred embodiment;

FIG. 16 shows values of some optical data corresponding to the imaging lens of the fourth preferred embodiment;

FIG. 17 shows values of some aspherical coefficients corresponding to the imaging lens of the fourth preferred embodiment;

FIG. 20 shows values of some optical data corresponding to the imaging lens of the fifth preferred embodiment;

FIG. 21 shows values of some aspherical coefficients corresponding to the imaging lens of the fifth preferred embodiment;

FIG. 24 shows values of some optical data corresponding to the imaging lens of the sixth preferred embodiment;

FIG. 25 shows values of some aspherical coefficients corresponding to the imaging lens of the sixth preferred embodiment;

FIG. 28 shows values of some optical data corresponding to the imaging lens of the seventh preferred embodiment;

FIG. 29 shows values of some aspherical coefficients corresponding to the imaging lens of the seventh preferred embodiment;

FIG. 31 is a table that lists values of relationships among some lens parameters corresponding to the imaging lenses of the first to seventh preferred embodiments;

DETAILED DESCRIPTION OF THE PREFERRED EMBODIMENTS

Figure 1:
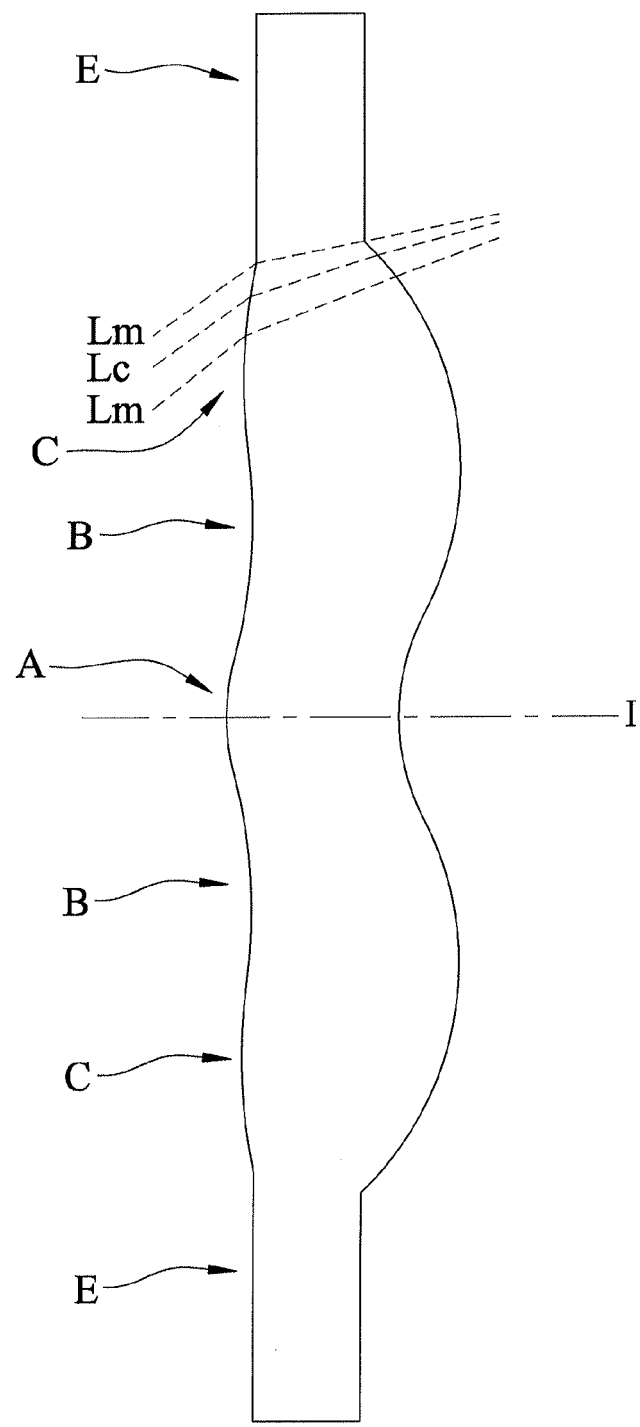
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
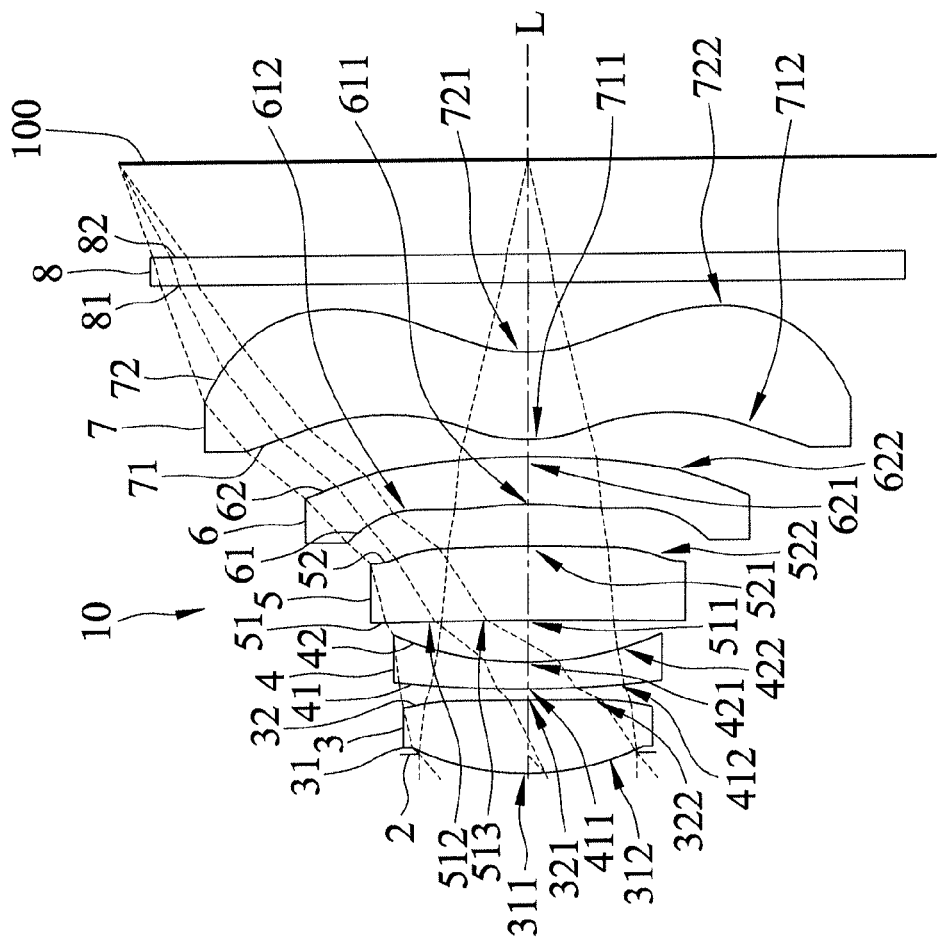
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, a first lens element 3, a second lens element 4, a third lens element 5, a fourth lens element 6, a fifth lens element 7 and an optical filter 8 arranged in the given order from an object side to an image side along an optical axis (I) of the imaging lens 10. The optical filter 8 is an infrared cut filter for selectively absorbing infrared light to thereby reduce imperfection of images formed at an image plane 100.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of optical filter 8, in the given order, to form an image on the image plane 100. In this embodiment, each of the object-side surfaces 31, 41, 51, 61, 71 and the image-side surfaces 32, 42, 52, 62, 72 is aspherical and has a center point coinciding with the optical axis (I).

Each of the lens elements 3-7 is made of a plastic material and has a refractive power in this embodiment. However, at least one of the lens elements 3, 4, 6 and 7 may be made of other materials in other embodiments.

In the first preferred embodiment, which is depicted in FIG. 2, the first lens element 3 has a positive refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 has a concave portion 321 in a vicinity of the optical axis (I), and a convex portion 322 in a vicinity of the periphery of the first lens element 3.

The second lens element 4 has a negative refractive power. The object-side surface 41 of the second lens element 4 is a convex surface that has a convex portion 411 in a vicinity of the optical axis (I), and a convex portion 412 in a vicinity of a periphery of the second lens element 4. The image-side surface 42 of the second lens element 4 is a concave surface that has a concave portion 421 in a vicinity of the optical axis (I), and a concave portion 422 in a vicinity of the periphery of the second lens element 4.

The third lens element 5 has a positive refractive power. The object-side surface 51 of the third lens element 5 has a convex portion 511 in a vicinity of the optical axis (I), a convex portion 512 in a vicinity of a periphery of the third lens element 5, and a concave portion 513 between the convex portions 511, 512. The image-side surface 52 of the third lens element 5 has a convex portion 521 in a vicinity of the optical axis (I), and a concave portion 522 in a vicinity of the periphery of the third lens element 5.

The fourth lens element 6 has a negative refractive power. The object-side surface 61 of the fourth lens element 6 is a concave surface that has a concave portion 611 in a vicinity of the optical axis (I), and a concave portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a positive refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

Figure 6:
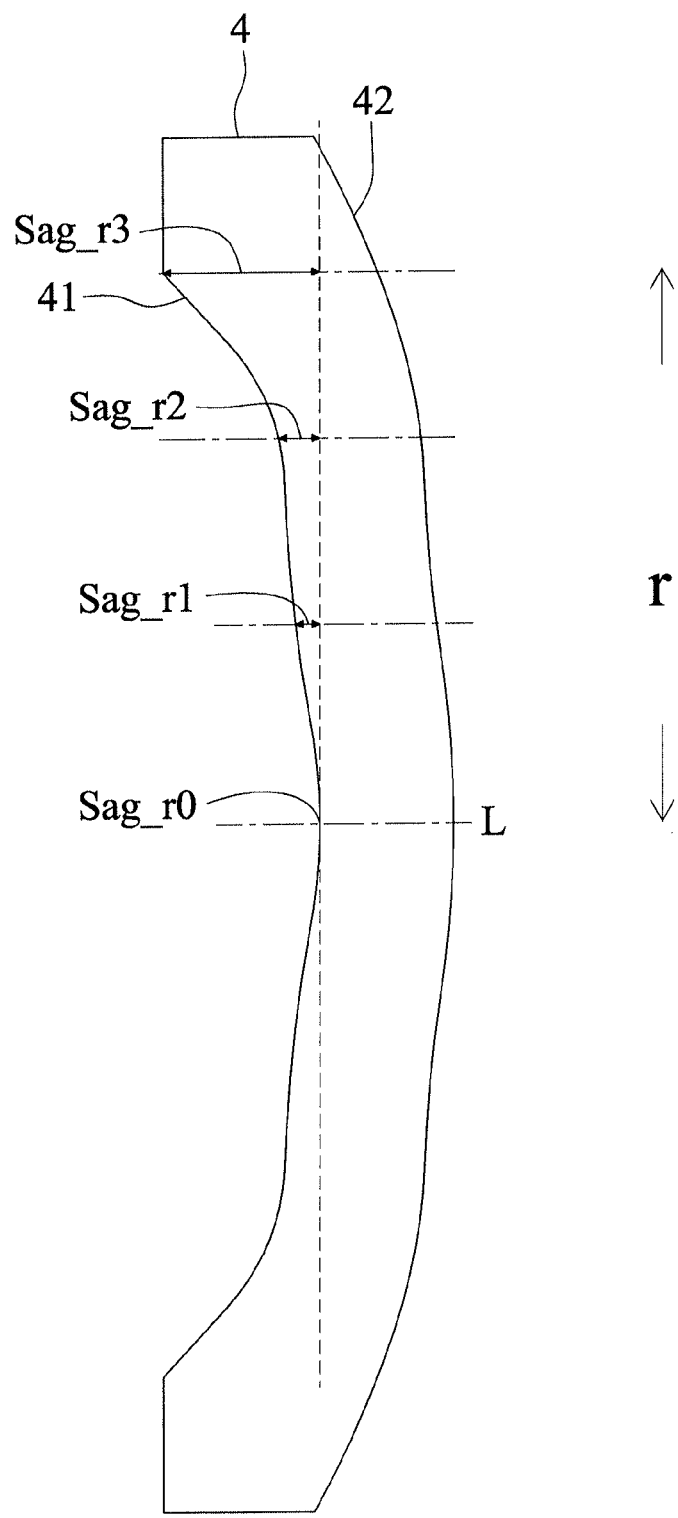
FIG. 6 is a schematic diagram to illustrate sags of the fourth lens element of the first preferred embodiment.

Referring to FIG. 6, the object-side surface 61 of the fourth lens element 6 has a sag value of Sag_r0 at the optical axis (I), a sag value of Sag_r1 at a surface point thereof corresponding to a distance of ⅓ of an effective optical radius thereof from the optical axis (I) in a radially outward direction, a sag value of Sag_r2 at a surface point thereof corresponding to a distance of ⅔ of the effective optical radius thereof from the optical axis (I) in the radially outward direction, and a sag value of Sag_r3 at a surface point thereof corresponding to a distance of the effective optical radius thereof from the optical axis (I) in the radially outward direction. The object-side surface 61 of the fourth lens element 6 satisfies:

|Sag_r1~Sag_r0|>|Sag_r2~Sag_r1| and

Sag_r3~Sag_r2|>|Sag_r2~Sag_r1|.

In this embodiment, a length of the effective optical radius r=1.309 mm, |Sag_r0|=0 mm, |Sag_r1|=0.03155 mm, |Sag_r2|=0.04578 mm, and |Sag_r3|=0.26528 mm.

In the first preferred embodiment, the imaging lens 10 does not include any lens element with refractive power other than the aforesaid lens elements 3-7.

Shown in FIG. 3 is a table that lists values of some optical data corresponding to the surfaces 31-81, 32-82 of the first preferred embodiment. The imaging lens 10 has an overall system effective focal length (EFL) of 3.436 mm, a half field-of-view (HFOV) of 41.91°, an F-number of 2.17, and a system length of 4.387 mm. The system length refers to a distance between the object-side surface 31 of the first lens element 3 and the image plane 100 at the optical axis (I).

In this embodiment, each of the object-side surfaces 31-71 and the image-side surfaces 32-72 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$, represents a $2i^{th}$ aspherical coefficient.

Shown in FIG. 4 is a table that lists values of some aspherical coefficients of the aforementioned relationship (1) corresponding to the first preferred embodiment. Each row in FIG. 4 lists the aspherical coefficients of a respective one of the object-side surfaces 31-71 and the image-side surfaces 32-72.

Relationships among some of the lens parameters corresponding to the first preferred embodiment are shown in FIG. 31 where:

T1 represents a thickness of the first lens element 3 at the optical axis (I);

T2 represents a thickness of the second lens element 5 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

G45 represents an air gap length between the fourth lens element 6 and the fifth lens element 7 at the optical axis (I); and ALT represents a sum of thicknesses of the first lens element 3, the second lens element 4, the third lens element 5, the fourth lens element 6 and the fifth lens element 7 at the optical axis (I) (i.e., the sum of T1, T2, T3, T4 and T5).

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown. It can be understood from FIG. 5(a) that, since each of the curves corresponding to longitudinal spherical aberration has a focal length at each field of view (indicated by the vertical axis) that falls within the range of ±0.04 mm, the first preferred embodiment is able to achieve a relatively low spherical aberration at each of the wavelengths. Furthermore, since the curves at each field of view are close to each other, the first preferred embodiment has a relatively low chromatic aberration.

Figure 5:
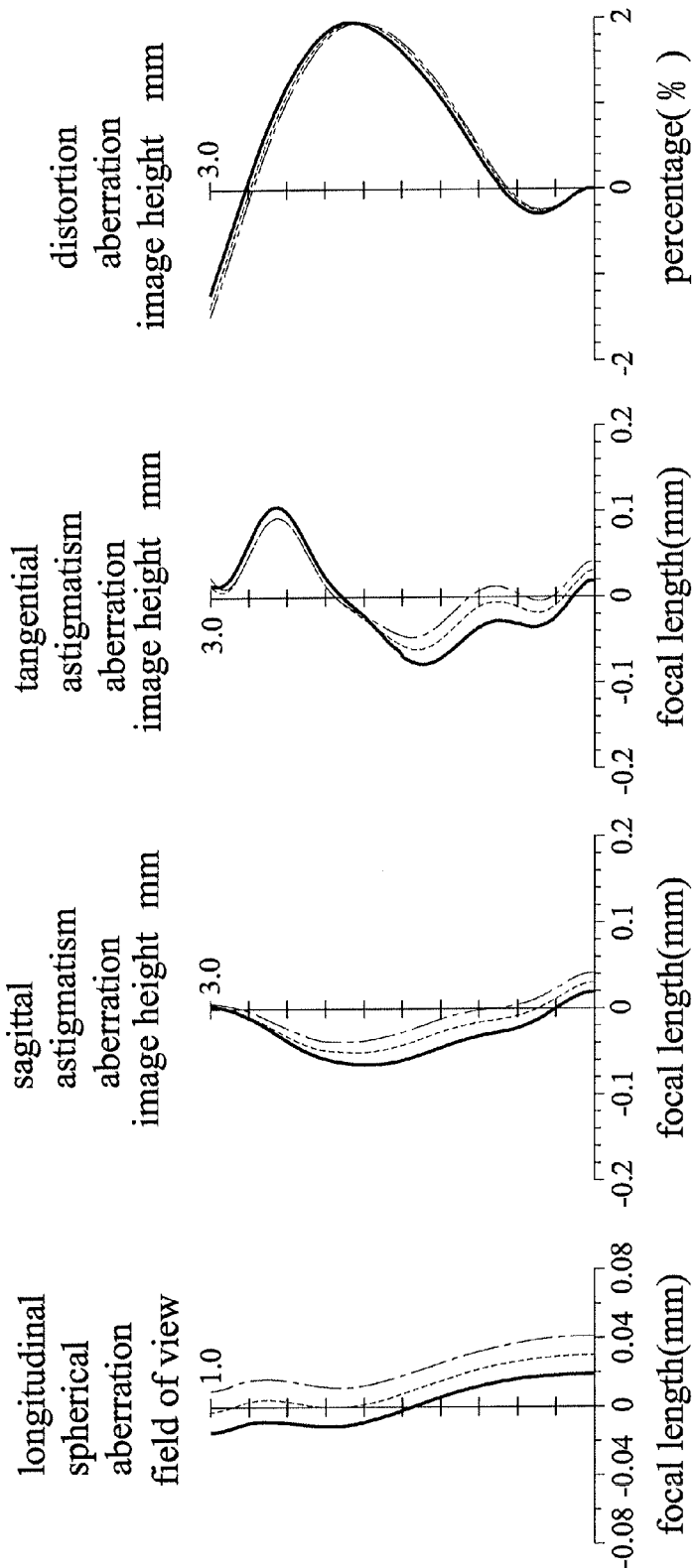
FIGS. 5(a) to 5(d) show different optical characteristics of the imaging lens of the first preferred embodiment.

It can be understood from FIGS. 5(b) and 5(c) that, since each of the curves falls within the range of ±0.1 mm of focal length, the first preferred embodiment has a relatively low optical aberration. Moreover, as shown in FIG. 5(d), since each of the curves corresponding to distortion aberration falls within the range of ±2%, the first preferred embodiment is able to meet requirements in imaging quality of most optical systems. In view of the above, even with the system length reduced down to below 4.4 mm, the imaging lens 10 of the first preferred embodiment is still able to achieve a relatively good optical performance.

Figure 7:
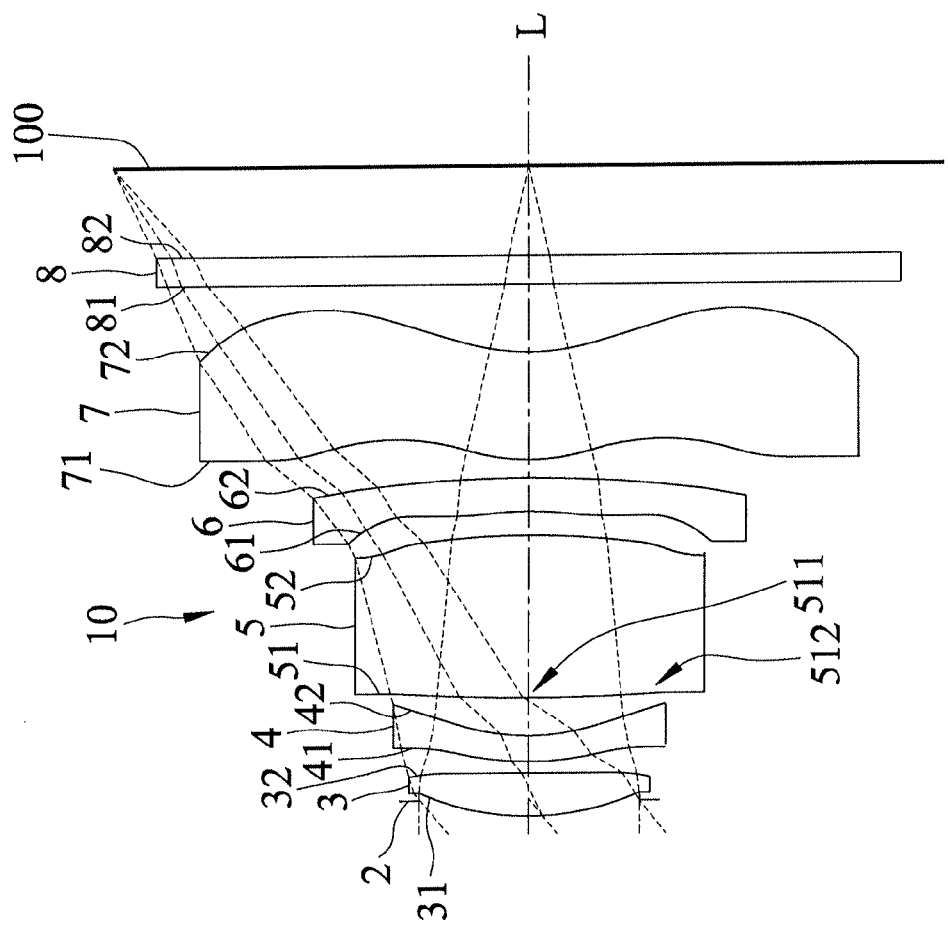
FIG. 7 is a schematic diagram that illustrates the second preferred embodiment of an imaging lens according to the present invention.
Figure 10:
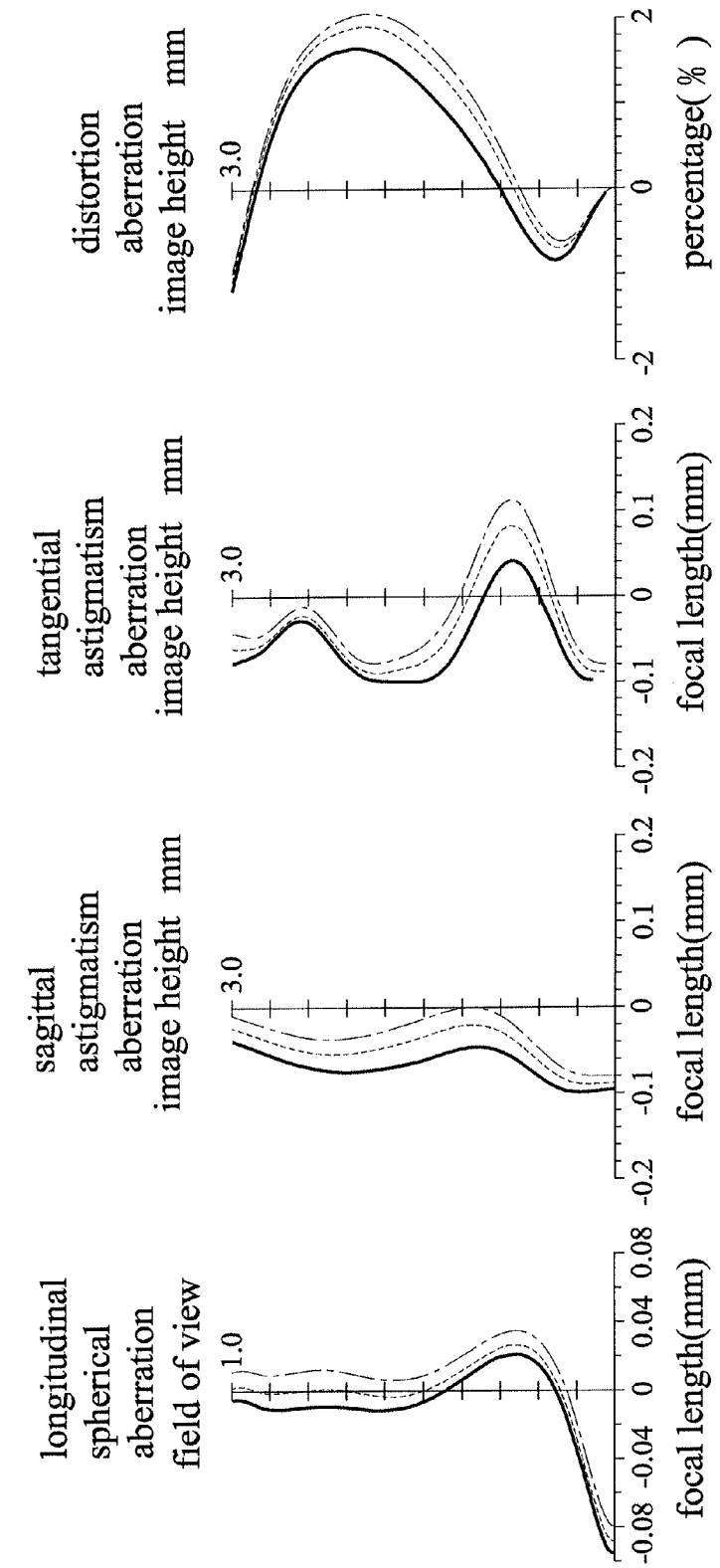
FIGS. 10(a) to 10(d) show different optical characteristics of the imaging lens of the second preferred embodiment.

Referring to FIG. 7, the difference between the first and second preferred embodiments of the imaging lens 10 of this invention reside in radius of curvature, refractive power of the lens elements, thicknesses, and aspherical coefficients of the lens elements, a rear focal length of the imaging lens 10, or other related parameters. In addition, the object-side surface 51 of the third lens element 5 only has a convex portion 511 in a vicinity of the optical axis (I), and a convex portion 512 in a vicinity of the periphery of the third lens element 5. It should be noted herein that, in order to clearly illustrate the second preferred embodiment, reference numerals of the convex and concave portions that are the same as those of the first preferred embodiment are omitted in FIG. 7.

The second preferred embodiment satisfies $|Sag\_r1\sim Sag\_r0|>|Sag\_r2\sim Sag\_r1|$ and $|Sag\_r3\sim Sag\_r2|>|Sag\_r2\sim Sag\_r1|$, where r=1.351 mm, $|Sag\_r0|$=0 mm, $|Sag\_r1|$=0.03643 mm, $|Sag\_r2|$=0.04375 mm and $|Sag\_r3|$=0.23808 mm.

Shown in FIG. 8 is a table that lists values of some optical data corresponding to the surfaces 31-81, 32-82 of the second preferred embodiment. The imaging lens 10 has an overall system focal length of 3.552 mm, an HFOV of 39.53°, an F-number of 2.26, and a system length of 4.772 mm.

Shown in FIG. 9 is a table that lists values of some aspherical coefficients of the aforementioned relationship (1) corresponding to the second preferred embodiment.

Relationships among some of the aforementioned lens parameters corresponding to the second preferred embodiment are shown in FIG. 31.

FIGS. 10(a) to 10(d) respectively show simulation results corresponding to longitudinal spherical aberration, saggital astigmatism aberration, tangential astigmatism aberration, and distortion aberration of the second preferred embodiment. It can be understood from FIGS. 10 (a) to 10 (d) that the second preferred embodiment is able to achieve a relatively good optical performance.

Figure 11:
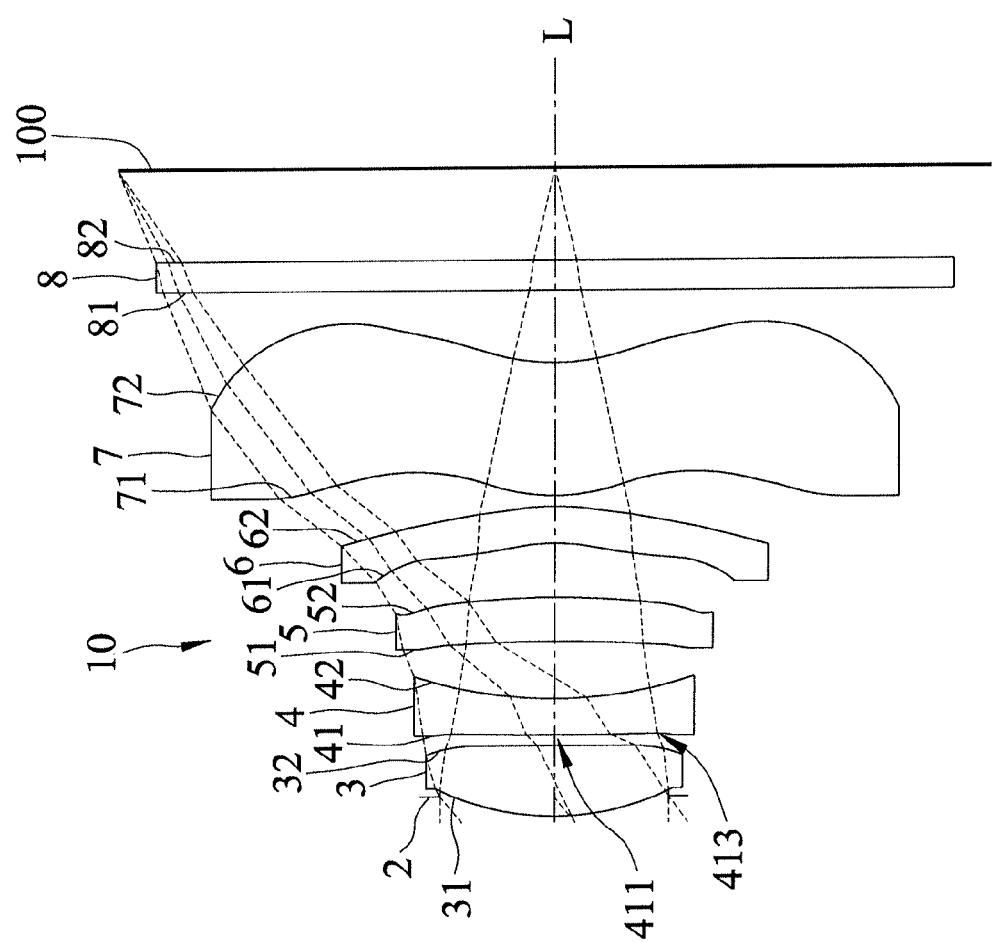
FIG. 11 is a schematic diagram that illustrates the third preferred embodiment of an imaging lens according to the present invention.
Figure 14:
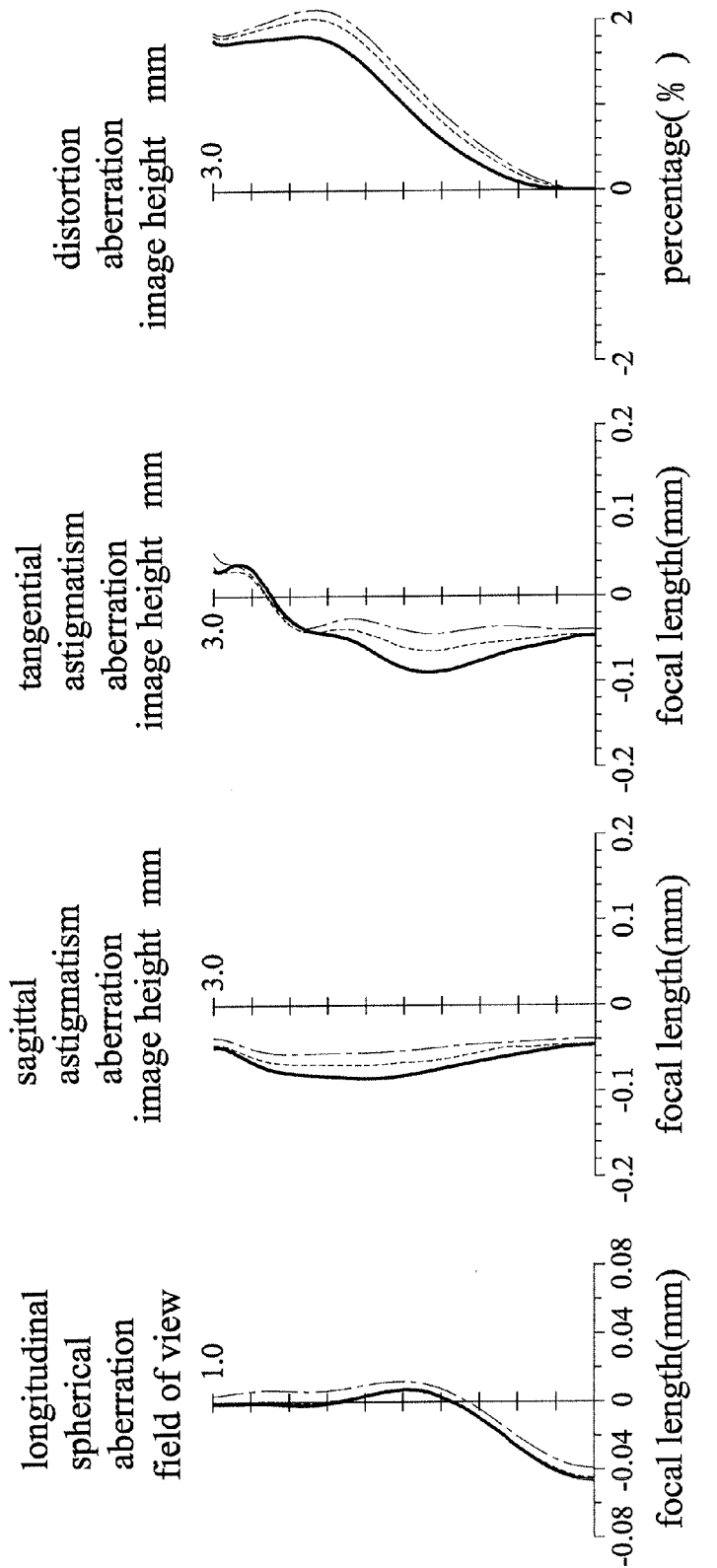
FIGS. 14(a) to 14(d) show different optical characteristics of the imaging lens of the third preferred embodiment.

FIG. 11 illustrates a third preferred embodiment of an imaging lens 10 according to the present invention, which has a configuration similar to that of the first preferred embodiment and differs in radius of curvature, refractive power, thicknesses and aspherical coefficients of the lens elements, a rear focal length of the imaging lens 10, or other related parameters. In addition, the object-side surface 41 of the second lens element 4 has a convex portion 411 in a vicinity of the optical axis (I), and a concave portion 413 in a vicinity of the periphery of the second lens element 4. It should be noted herein that, in order to clearly illustrate the third preferred embodiment, reference numerals of the convex and concave portions that are the same as those of the first preferred embodiment are omitted in FIG. 11.

The third preferred embodiment satisfies $|Sag\_r1\sim Sag\_r0|>|Sag\_r2\sim Sag\_r1|$ and $|Sag\_r3\sim Sag\_r2|>|Sag\_r2\sim Sag\_r1|$, where r=1.251 mm, $|Sag\_r0|$=0 mm, $|Sag\_r1|$=0.05628 mm, $|Sag\_r2|$=0.10696 mm and $|Sag\_r3|$=0.27041 mm.

Shown in FIG. 12 is a table that lists values of some optical data corresponding to the surfaces 31-81, 32-82 of the third preferred embodiment. The imaging lens 10 has an overall system focal length of 3.460 mm, an HFOV of 40.00°, an F-number of 2.24, and a system length of 4.461 mm.

Shown in FIG. 13 is a table that lists values of some aspherical coefficients of the aforementioned relationship (1) corresponding to the third preferred embodiment.

Relationships among some of the aforementioned lens parameters corresponding to the third preferred embodiment are shown in FIG. 31.

FIGS. 14(a) to 14(d) respectively show simulation results corresponding to longitudinal spherical aberration, saggital astigmatism aberration, tangential astigmatism aberration, and distortion aberration of the third preferred embodiment. It can be understood from FIGS. 14 (a) to 14 (d) that the third preferred embodiment is able to achieve a relatively good optical performance.

Figure 15:
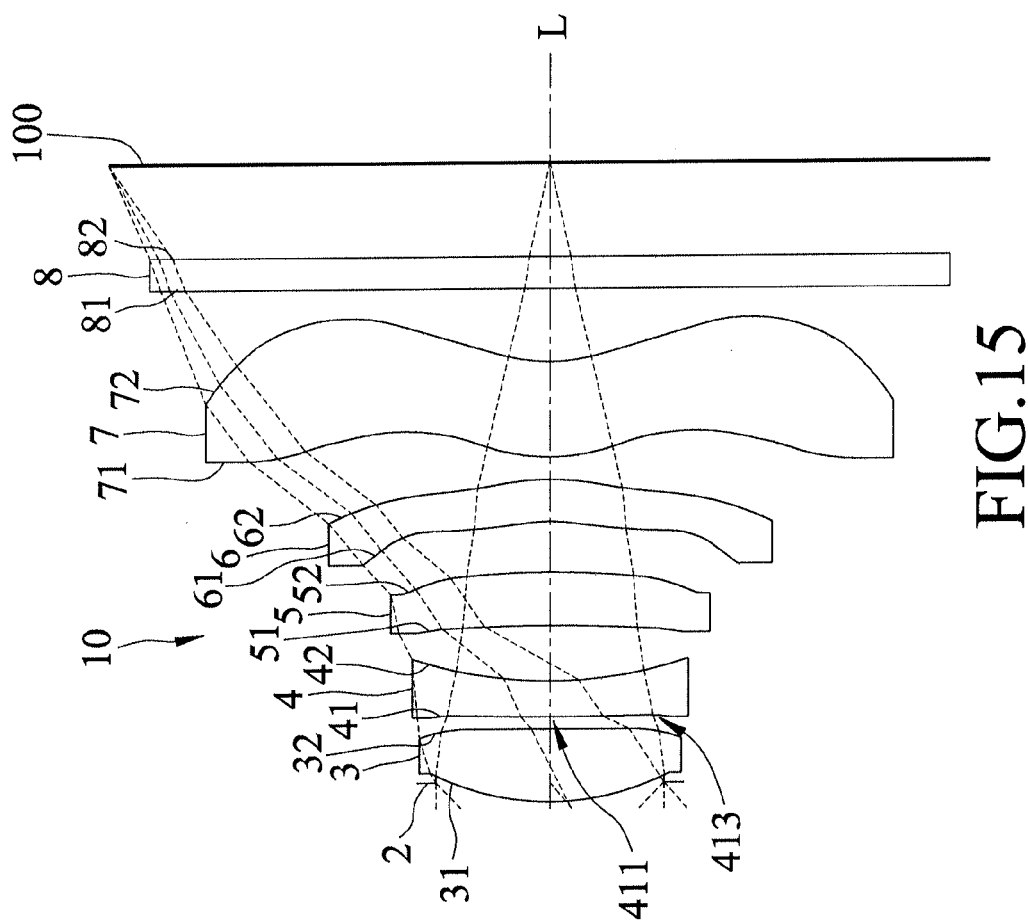
FIG. 15 is a schematic diagram that illustrates the fourth preferred embodiment of an imaging lens according to the present invention.
Figure 18:
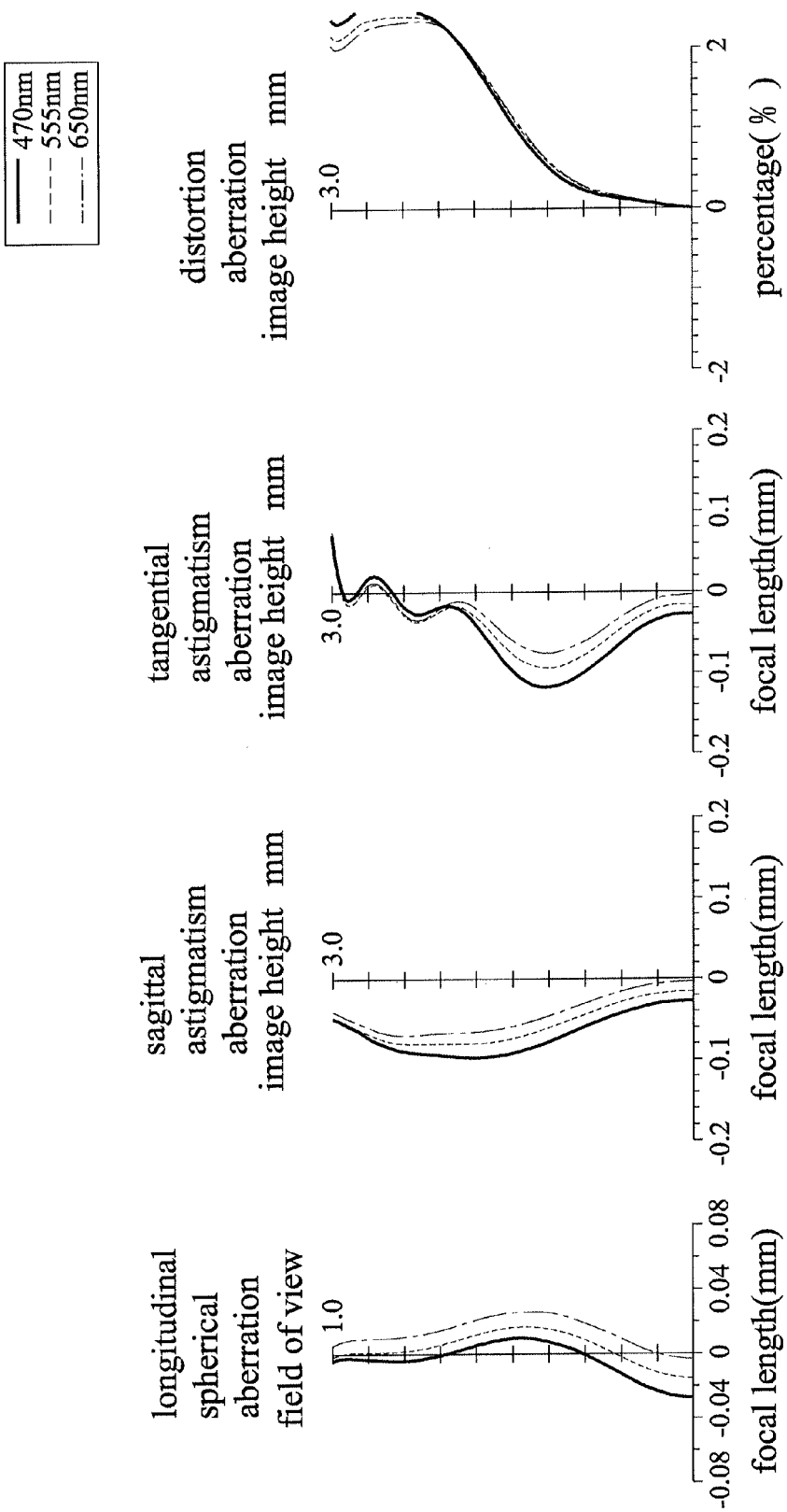
FIGS. 18(a) to 18(d) show different optical characteristics of the imaging lens of the fourth preferred embodiment.

FIG. 15 illustrates a fourth preferred embodiment of an imaging lens 10 according to the present invention, which has a configuration similar to that of the first preferred embodiment and differs in radius of curvature, refractive power, thicknesses and aspherical coefficients of the lens elements, and a rear focal length of the imaging lens 10 or other related parameters. In addition, the object-side surface 41 of the second lens element 4 has a convex portion 411 in a vicinity of the optical axis (I), and a concave portion 413 in a vicinity of the periphery of the second lens element 4. It should be noted herein that, in order to clearly illustrate the fourth preferred embodiment, reference numerals of the convex and concave portions that are the same as those of the first preferred embodiment are omitted in FIG. 15.

The fourth preferred embodiment satisfies $|Sag\_r1\sim Sag\_r0|>|Sag\_r2\sim Sag\_r1|$ and $|Sag\_r3\sim Sag\_r2|>|Sag\_r2\sim Sag\_r1|$, where r=1.274 mm, $|Sag\_r0|$=0 mm, $|Sag\_r1|$=0.04388 mm, $|Sag\_r2|$=0.07550 mm and $|Sag\_r3|$=0.29143 mm.

Shown in FIG. 16 is a table that lists values of some optical data corresponding to the surfaces 31-81, 32-82 of the fourth preferred embodiment. The imaging lens 10 has an overall system focal length of 3.446 mm, an HFOV of 40.28°, an F-number of 2.21, and a system length of 4.332 mm.

Shown in FIG. 17 is a table that lists values of some aspherical coefficients of the aforementioned relationship (1) corresponding to the fourth preferred embodiment.

Relationships among some of the aforementioned lens parameters corresponding to the fourth preferred embodiment are shown in FIG. 31.

FIGS. 18(a) to 18(d) respectively show simulation results corresponding to longitudinal spherical aberration, saggital astigmatism aberration, tangential astigmatism aberration, and distortion aberration of the fourth preferred embodiment. It can be understood from FIGS. 18(a) to 18(d) that the fourth preferred embodiment is able to achieve a relatively good optical performance.

Figure 19:
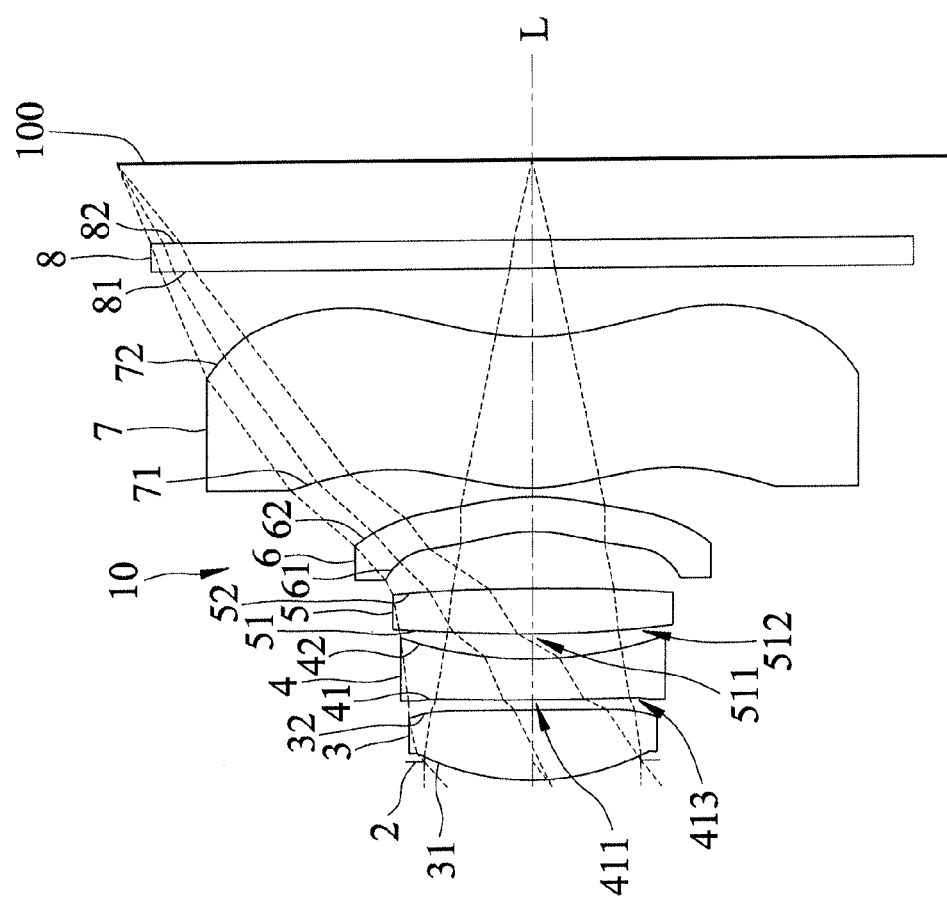
FIG. 19 is a schematic diagram that illustrates the fifth preferred embodiment of an imaging lens according to the present invention.
Figure 22:
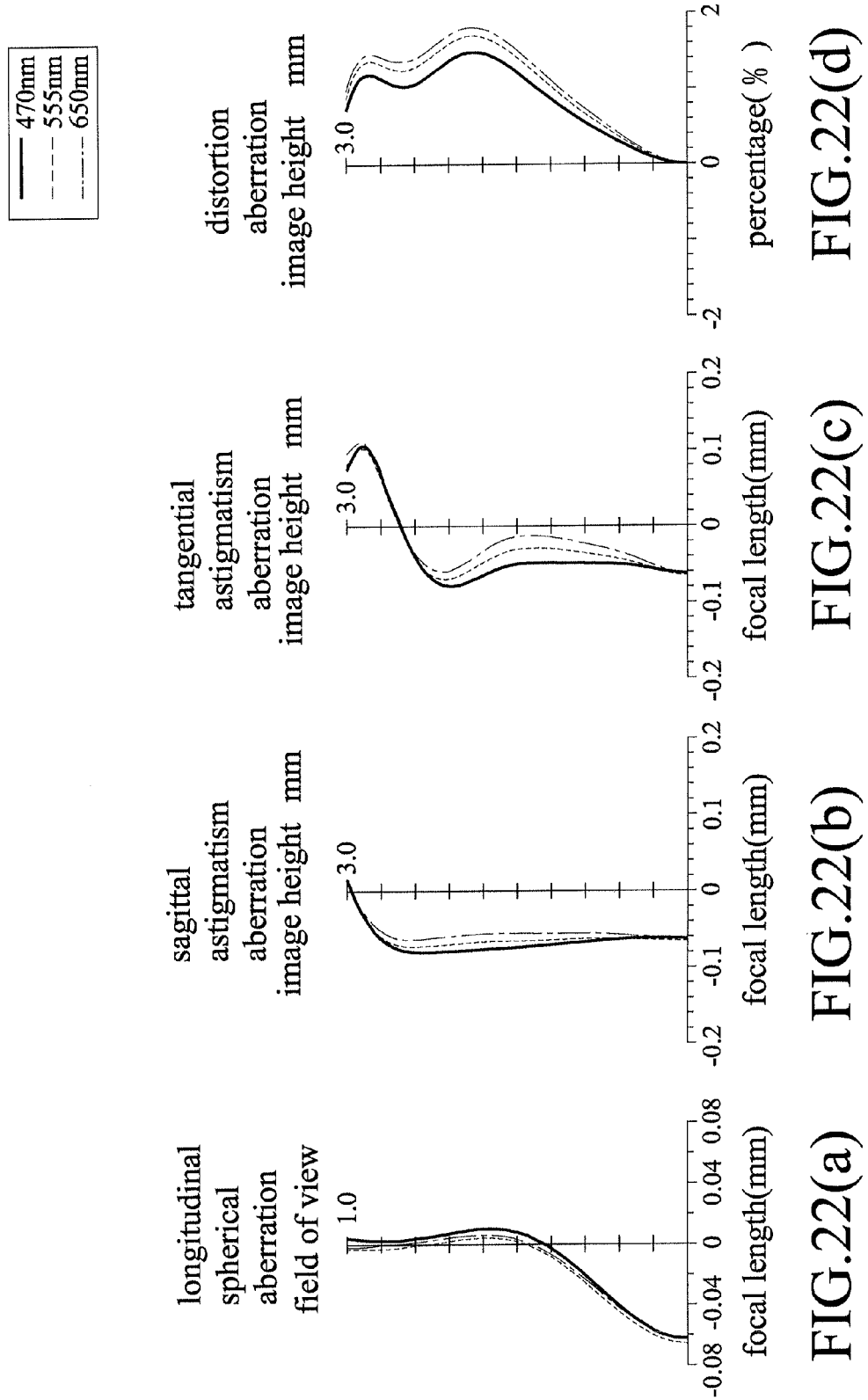
FIGS. 22(a) to 22(d) show different optical characteristics of the imaging lens of the fifth preferred embodiment.

FIG. 19 illustrates a fifth preferred embodiment of an imaging lens 10 according to the present invention, which has a configuration similar to that of the first preferred embodiment and differs in radius of curvature, refractive power, thicknesses, and aspherical coefficients of the lens elements, and a rear focal length of the imaging lens 10 or other related parameters. In addition, the object-side surface 41 of the second lens element 4 has a convex portion 411 in a vicinity of the optical axis (I), and a concave portion 413 in a vicinity of the periphery of the second lens element 4. The object-side surface 51 of the third lens element 5 only has a convex portion 511 in a vicinity of the optical axis (I), and a convex portion 512 in a vicinity of the periphery of the third lens element 5. It should be noted herein that, in order to clearly illustrate the fifth preferred embodiment, reference numerals of the convex and concave portions that are the same as those of the first preferred embodiment are omitted in FIG. 19.

The fifth preferred embodiment satisfies |Sag_r1−Sag_r0|>|Sag_r2~Sag_r1| and |Sag_r3−Sag_r2|>|Sag_r2−Sag_r1|, where r=1.067 mm, |Sag_r0|=0 mm, |Sag_r1|=0.05801 mm, |Sag_r2|=0.10660 mm and |Sag_r3|=0.33760 mm.

Shown in FIG. 20 is a table that lists values of some optical data corresponding to the surfaces 31-81, 32-82 of the fifth preferred embodiment. The imaging lens 10 has an overall system focal length of 3.419 mm, an HFOV of 40.38°, an F-number of 2.26, and a system length of 4.460 mm.

Shown in FIG. 21 is a table that lists values of some aspherical coefficients of the aforementioned relationship (1) corresponding to the fifth preferred embodiment.

Relationships among some of the aforementioned lens parameters corresponding to the fifth preferred embodiment are shown in FIG. 31.

FIGS. 22(a) to 22(d) respectively show simulation results corresponding to longitudinal spherical aberration, saggital astigmatism aberration, tangential astigmatism aberration, and distortion aberration of the fifth preferred embodiment. It can be understood from FIGS. 22(a) to 22(d) that the fifth preferred embodiment is able to achieve a relatively good optical performance.

Figure 23:
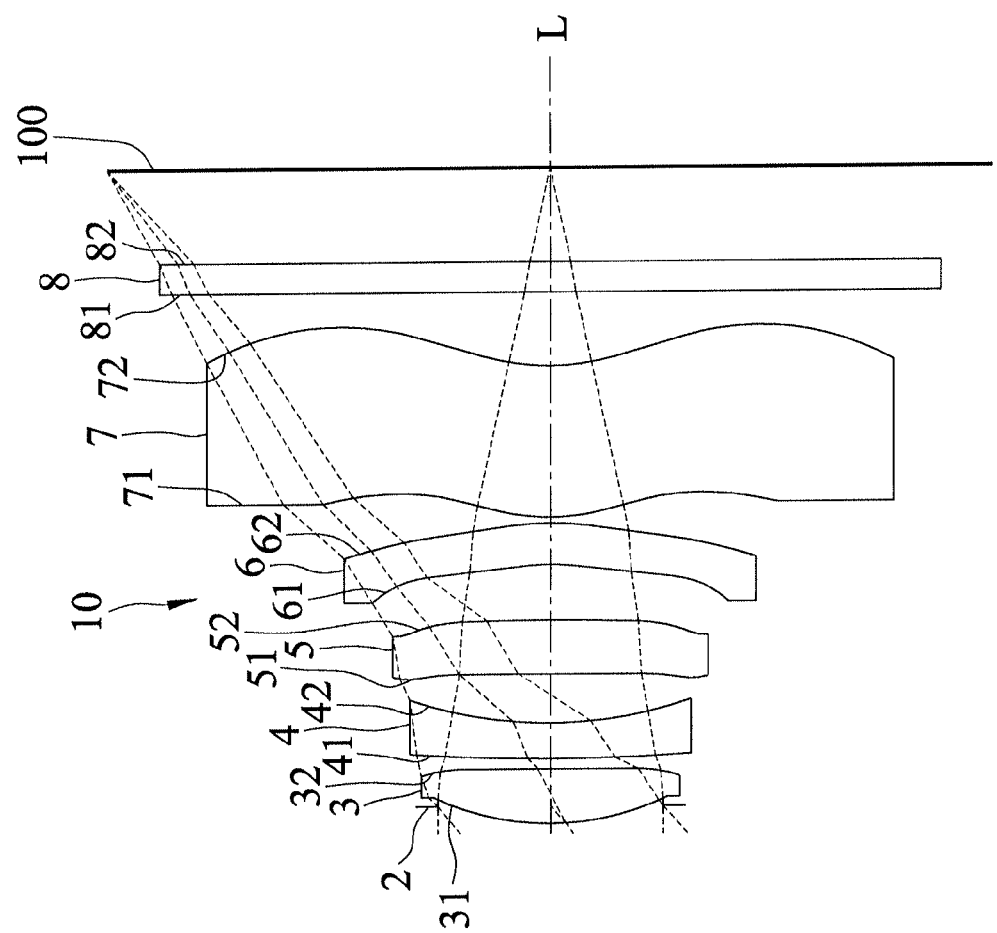
FIG. 23 is a schematic diagram that illustrates the sixth preferred embodiment of an imaging lens according to the present invention.
Figures 26A, 26B, 26C, 26D:
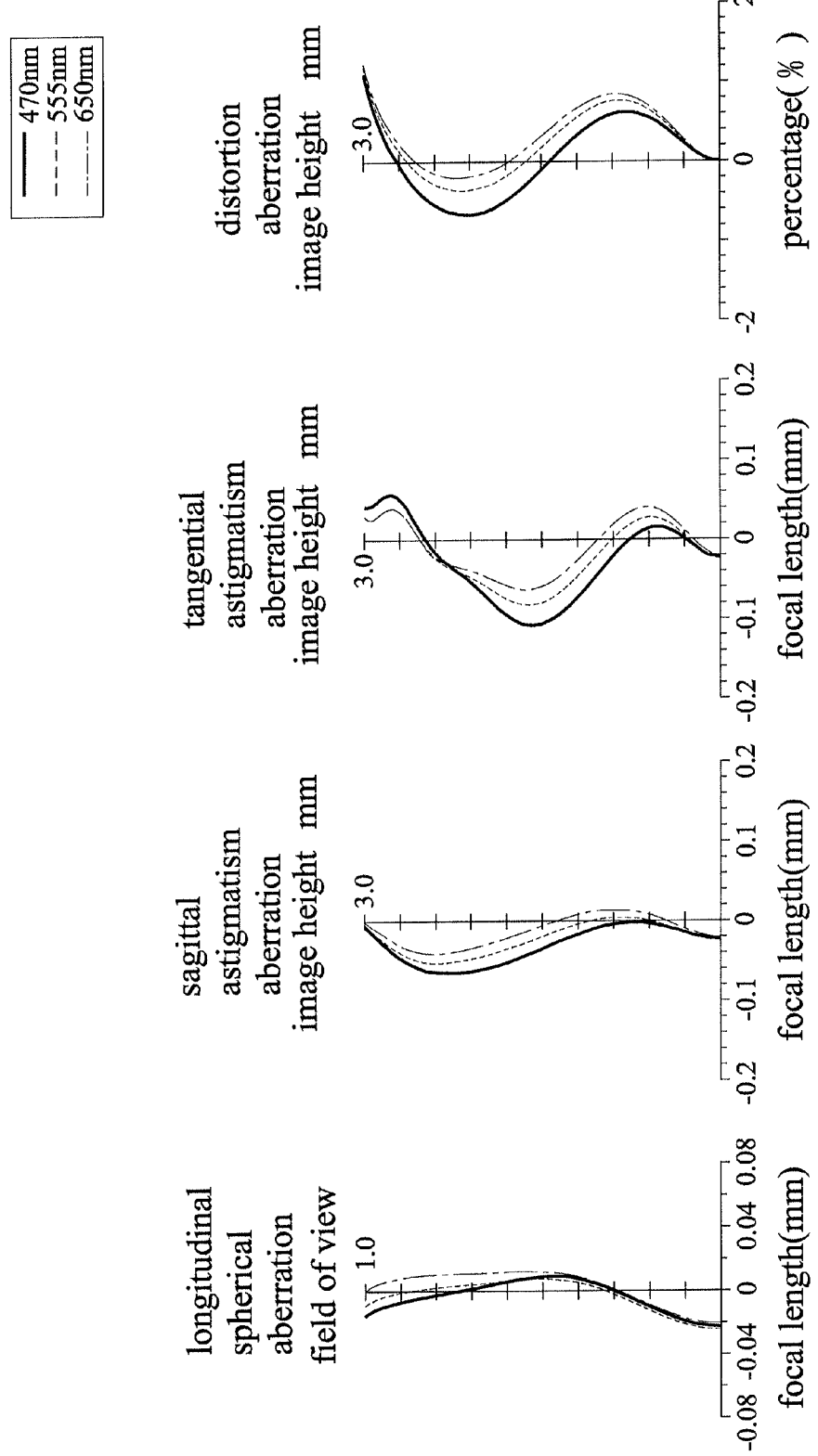
FIGS. 26(a) to 26(d) show different optical characteristics of the imaging lens of the sixth preferred embodiment.

FIG. 23 illustrates a sixth preferred embodiment of an imaging lens 10 according to the present invention, which has a configuration similar to that of the first preferred embodiment and differs in radius of curvature, refractive power, thicknesses and aspherical coefficients of the lens elements, and a rear focal length of the imaging lens 10 or other related parameters. It should be noted herein that, in order to clearly illustrate the sixth preferred embodiment, reference numerals of the convex and concave portions that are the same as those of the first preferred embodiment are omitted in FIG. 23.

The sixth preferred embodiment satisfies |Sag_r1~Sag_r0|>|Sag_r2−Sag_r1| and |Sag_r3−Sag_r2|>|Sag_r2−Sag_r1|, where r=1.230 mm, |Sag_r0|=0 mm, |Sag_r1|=0.05210 mm, |Sag_r2|0.08819 mm and |Sag_r3|=0.25217 mm.

Shown in FIG. 24 is a table that lists values of some optical data corresponding to the surfaces 31-81, 32-82 of the sixth preferred embodiment. The imaging lens 10 has an overall system focal length of 3.436 mm, an HFOV of 40.53°, an F-number of 2.25, and a system length of 4.487 mm.

Shown in FIG. 25 is a table that lists values of some aspherical coefficients of the aforementioned relationship (1) corresponding to the sixth preferred embodiment.

Relationships among some of the aforementioned lens parameters corresponding to the sixth preferred embodiment are shown in FIG. 31.

FIGS. 26(a) to 26(d) respectively show simulation results corresponding to longitudinal spherical aberration, saggital astigmatism aberration, tangential astigmatism aberration, and distortion aberration of the sixth preferred embodiment. It can be understood from FIGS. 26(a) to 26(d) that the sixth preferred embodiment is able to achieve a relatively good optical performance.

Figure 27:
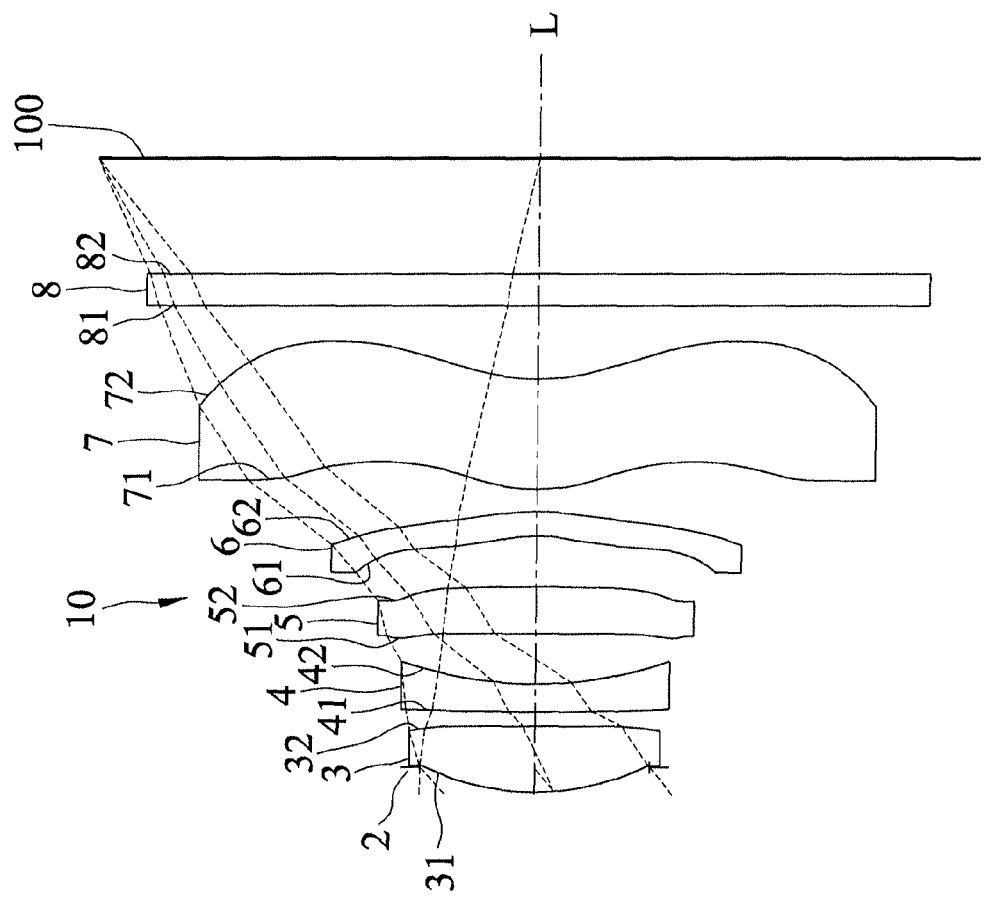
FIG. 27 is a schematic diagram that illustrates the seventh preferred embodiment of an imaging lens according to the present invention.

FIG. 27 illustrates a seventh preferred embodiment of an imaging lens 10 according to the present invention, which has a configuration similar to that of the first preferred embodiment and differs in radius of curvature, refractive power, thicknesses and aspherical coefficients of the lens elements, and a rear focal length of the imaging lens 10 or other related parameters. It should be noted herein that, in order to clearly illustrate the seventh preferred embodiment, reference numerals of the convex and concave portions that are the same as those of the first preferred embodiment are omitted in FIG. 27.

The seventh preferred embodiment satisfies |Sag_r1−Sag_r0|>|Sag_r2−Sag_r1| and |Sag_r3−Sag_r2|>|Sag_r2−Sag_r1|, where r=1.128 mm, |Sag_r0|=0 mm, Sag_r1|=0.04965 mm, |Sag_r2|=0.08681 mm and |Sag_|r3|0.24857 mm.

Shown in FIG. 28 is a table that lists values of some optical data corresponding to the surfaces 31-81, 32-82 of the seventh preferred embodiment. The imaging lens 10 has an overall system focal length of 3.383 mm, an HFOV of 42.04°, an F-number of 2.21, and a system length of 4.229 mm.

Shown in FIG. 29 is a table that lists values of some aspherical coefficients of the aforementioned relationship (1) corresponding to the seventh preferred embodiment.

Relationships among some of the aforementioned lens parameters corresponding to the seventh preferred embodiment are shown in FIG. 31.

Figure 30:
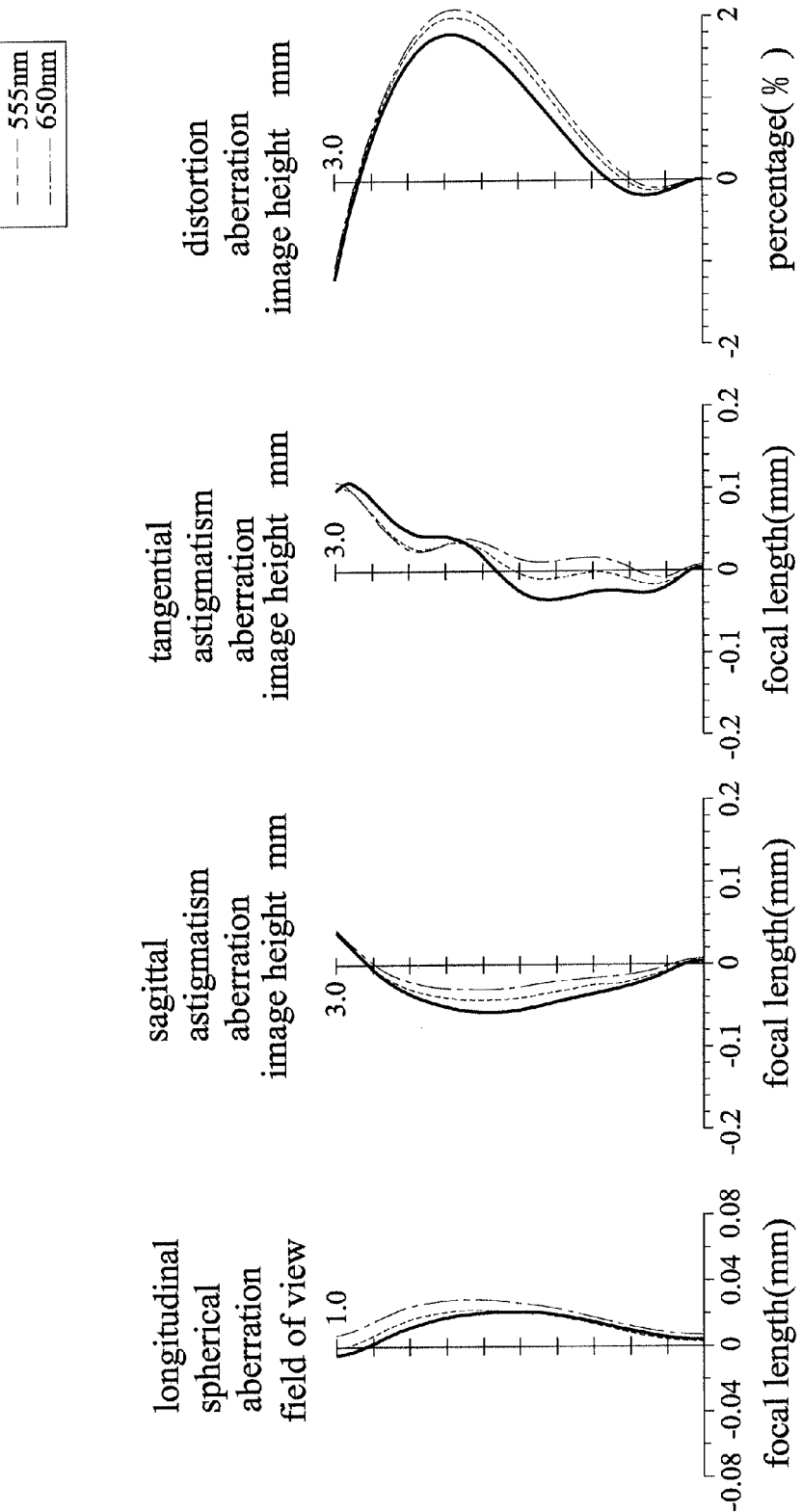
FIGS. 30(a) to 30(d) show different optical characteristics of the imaging lens of the seventh preferred embodiment.

FIGS. 30 (a) to 30(d) respectively show simulation results corresponding to longitudinal spherical aberration, saggital astigmatism aberration, tangential astigmatism aberration, and distortion aberration of the seventh preferred embodiment. It can be understood from FIGS. 30(a) to 30(d) that the seventh preferred embodiment is able to achieve a relatively good optical performance.

Shown in FIG. 31 is a table that lists the aforesaid relationships among some of the aforementioned lens parameters corresponding to the seven preferred embodiments for comparison. When the lens parameters of the imaging lens 10 according to this invention satisfy the following relationships, the optical performance is still relatively good even with the reduced system length:

(1) G34/G23 is proposed to be greater than or equal to 0.52, and G34/(G12+G45) is proposed to be greater than or equal 0.85: Narrowing G12, G23, G34, and G45 can aid in reducing the overall thickness of the imaging lens 10. However, with the specific sag design of the object-side surface 61 of the fourth lens element 6, expansion of G34 will enhance the ability of the imaging lens 10 to eliminate aberrations. Thus, G34 should be slightly larger, causing increase of G34/G23 and G34/(G12+G45). G34/G23 is proposed to be greater than or equal to 0.52, preferably between 0.52 and 3.0, and G34/(G12+G45) is proposed to be greater than or equal to 0.85, preferably between 0.85 and 4.0.

(2) ALT/G23 is proposed to be greater than or equal to 4.8, and T5/G23 is proposed to be greater than or equal to 1.45: Reductions of ALT and T5 are limited due to industrial manufacturing technology, whereas G23 is less restricted. Thus, ALT/G23 and T5/G23 will tend to be large, where ALT/G23 is proposed to be greater than or equal to 4.8, preferably between 4.8 and 15.0, and T5/G23 is proposed to be greater than or equal to 1.45, preferably between 1.45 and 7.0.

(3) T1/(G12+G45) is proposed to be greater than or equal to 2.0, T5/(G12+G45) is proposed to be greater than or equal to 3.6, T3/(G12+G45) is proposed to be greater than or equal to 1.8, and ALT/(G12+G45) is proposed to be greater than or equal to 7.3: Taking the aforementioned description into consideration, reduction of the thickness of each of the lens elements, such as T1, T3, T5 and ALT, is limited due to industrial manufacturing technology; and the gaps such as G12 and G45 should be designed to be small, thus increasing the values of T1/(G12+G45), T5/(G12+G45), T3/(G12+G45) and ALT/(G12+G45). Thus, it is recommended that T1/(G12+G45) should be greater than or equal to 2.0, preferably between 2.0 and 4.0, T5/(G12+G45) should be greater than or equal to 3.6, preferably between 3.6 and 10.0, T3/(G12+G45) should be greater than or equal to 1.8, preferably between 1.8 and 6.0, and ALT/(G12+G45) should be greater than or equal to 7.3, preferably between 7.3 and 25.0.

(4) ALT/T4 is proposed to be greater than or equal to 6.0, (T5+T1)/T4 is proposed to be greater than or equal to 3.8, and T5/T4 is proposed to be greater than or equal to 1.8: T1, T4, T5 and ALT should maintain an appropriate ratio thereamong in order to prevent the thickness of any lens element from being too thick, thus affecting the thin design of the portable electronic devices, or too thin, causing manufacturing issues. Thus, it is recommended that ALT/T4 should be greater than or equal to 6.0, preferably between 6.0 and 15.0, (T5+T1)/T4 should be greater than or equal to 3.8, preferably between 3.8 and 8.0, and T5/T4 is greater than or equal to 1.8, preferably between 1.8 and 6.0.

To sum up, effects and advantages of the imaging lens 10 according to the present invention are described hereinafter.

1) The convex object-side surface 31 of the first lens element 3 can assist in the collection of the rays/beams of light. The concave image-side surface 41 of the second lens element 4, and the concave portion 721 and the convex portion 722 of the image-side surface 72 of the fifth lens element 7, can be configured to cooperatively improve image quality. In addition, the third lens element 5 is made of a plastic material, which allows more flexibility, be it a convex or concave design.

2) When the object-side surface 61 of the fourth lens element 6 satisfies |Sag_r1−Sag_r0|>|Sag_r2~Sag_r1| and |Sag_r3−Sag_r2|>|Sag_r2−Sag_r1|, the optical aberration correcting capability is improved.

3) Through design of the relevant optical parameters, optical aberrations, such as spherical aberration, may be reduced or even eliminated. Further, through surface design and arrangement of the lens elements 3-7, even with the system length reduced, optical aberrations may still be reduced or even eliminated, resulting in relatively good optical performance.

4) Through the aforesaid seven preferred embodiments, it is known that the length of the imaging lens 10 of this invention may be reduced down to below 4.80 mm while maintaining good optical performance.

Figure 32:
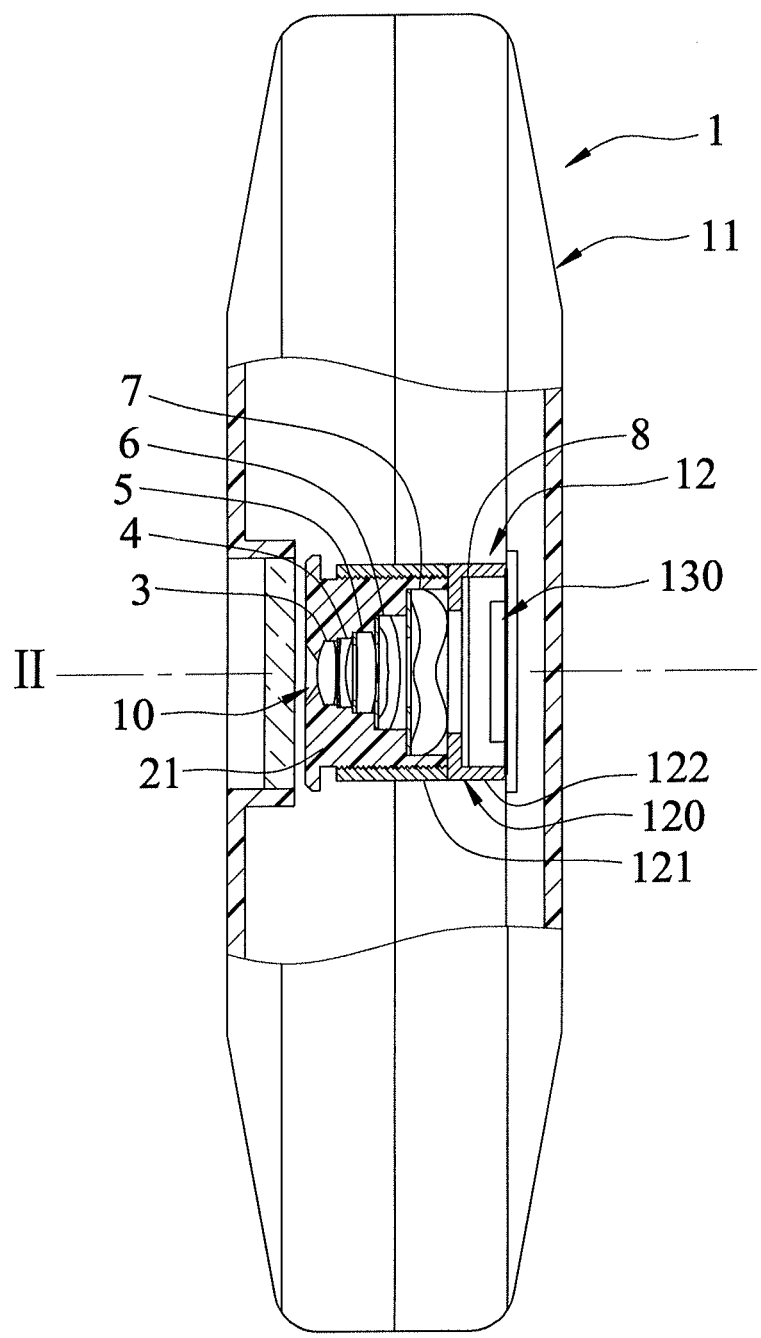
FIG. 32 is a schematic partly sectional view to illustrate a first exemplary application of the imaging lens of the present invention.

Shown in FIG. 32 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 33:
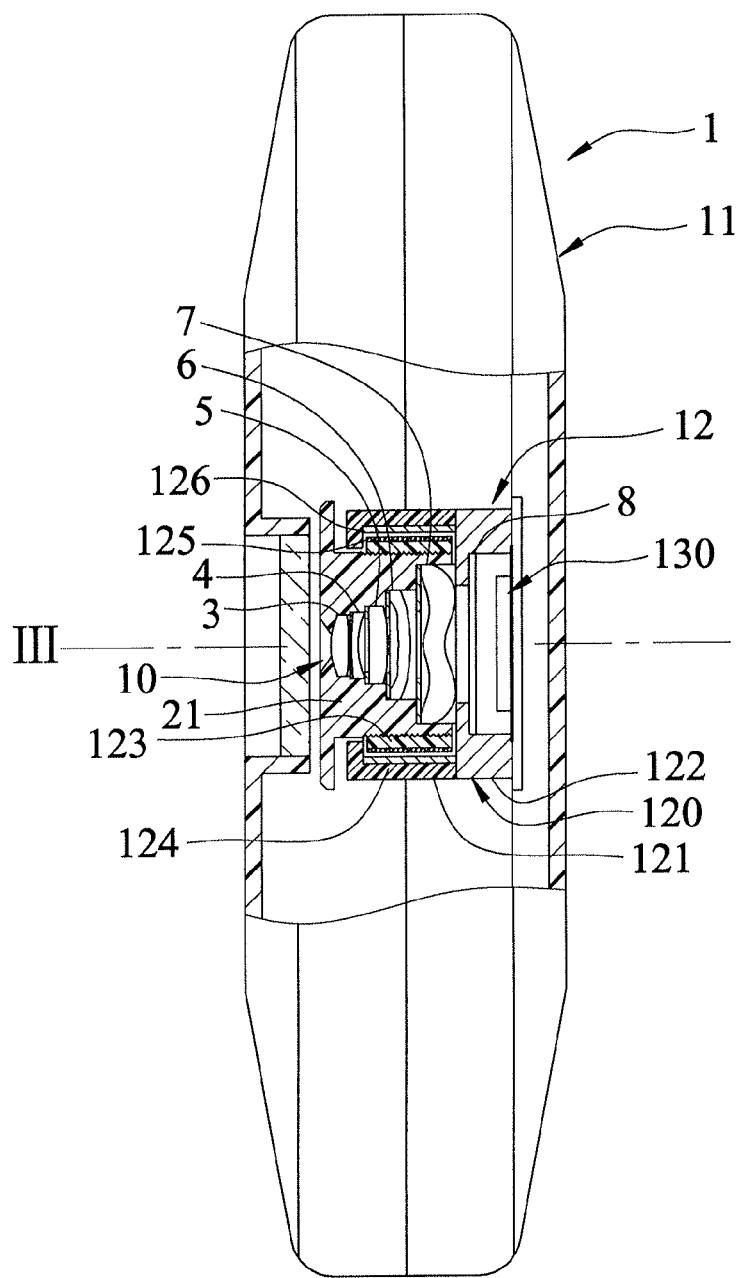
FIG. 33 is a schematic partly sectional view to illustrate a second exemplary application of the imaging lens of the present invention.

Shown in FIG. 33 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:

said object-side surface of said first lens element is a convex surface, and has a convex portion in a vicinity of the optical axis, and a convex portion in a vicinity of a periphery of said first lens element;

said image-side surface of said second lens element is a concave surface, and has a concave portion in a vicinity of the optical axis, and a concave portion in a vicinity of a periphery of said second lens element;

said third lens element is made of a plastic material;

said object-side surface of said fourth lens element has a sag value of Sag_r0 at the optical axis, a sag value of Sag_r1 at a surface point thereof corresponding to a distance of ⅓ of an effective optical radius thereof from the optical axis in a radially outward direction, a sag value of Sag_r2 at a surface point thereof corresponding to a distance of ⅔ of the effective optical radius thereof from the optical axis in the radially outward direction, and a sag value of Sag_r3 at a surface point thereof corresponding to a distance of the effective optical radius thereof from the optical axis in the radially outward direction, said object-side surface of said fourth lens element satisfying:

|Sag_r1−Sag_r0|>|Sag_r2−Sag_r1| and

Sag_r3−Sag_r2|>|Sag_r2−Sag_r1|;

said image-side surface of said fifth lens element has a concave portion in a vicinity of the optical axis, and a convex portion in a vicinity of a periphery of said fifth lens element; and said imaging lens does not include any lens element with refractive power other than said first lens element, said second lens element, said third lens element, said fourth lens element and said fifth lens element.

2. The imaging lens as claimed in claim 1, satisfying G34/G23≥0.52, where G34 represents an air gap length between said third lens element and said fourth lens element at the optical axis, and G23 represents an air gap length between said second lens element and said third lens element at the optical axis.

3. The imaging lens as claimed in claim 2, further satisfying ALT/T4≥6.0, where ALT represents a sum of thicknesses of said first lens element, said second lens element, said third lens element, said fourth lens element and said fifth lens element at the optical axis, and T4 represents the thickness of said fourth lens element at the optical axis.

4. The imaging lens as claimed in claim 3, further satisfying T1/(G12+G45)≥2.0, where G12 represents an air gap length between said first lens element and said second lens element at the optical axis, G45 represents an air gap length between said fourth lens element and said fifth lens element at the optical axis, and T1 represents the thickness of said first lens element at the optical axis.

5. The imaging lens as claimed in claim 1, satisfying ALT/G23≥4.8, where ALT represents a sum of thicknesses of said first lens element, said second lens element, said third lens element, said fourth lens element and said fifth lens element at the optical axis, and G23 represents an air gap length between said second lens element and said third lens element at the optical axis.

6. The imaging lens as claimed in claim 5, further satisfying G34/(G12+G45)≥0.85, where G12 represents an air gap length between said first lens element and said second lens element at the optical axis, G34 represents an air gap length between said third lens element and said fourth lens element at the optical axis, and G45 represents an air gap length between said fourth lens element and said fifth lens element at the optical axis.

7. The imaging lens as claimed in claim 6, further satisfying (T1+T5)/T4≥3.8, where T1 represents the thickness of said first lens element at the optical axis, T4 represents the thickness of said fourth lens element at the optical axis, and T5 represents the thickness of said fifth lens element at the optical axis.

8. The imaging lens as claimed in claim 1, satisfying T5/G23≥1.45, where T5 represents a thickness of said fifth lens element at the optical axis, and G23 represents an air gap length between said second lens element and said third lens element at the optical axis.

9. The imaging lens as claimed in claim 8, further satisfying 0.85≤G34/(G12+G45)≤0.3, where G12 represents an air gap length between said first lens element and said second lens element at the optical axis, G34 represents an air gap length between said third lens element and said fourth lens element at the optical axis, and G45 represents an air gap length between said fourth lens element and said fifth lens element at the optical axis.

10. The imaging lens as claimed in claim 9, further satisfying T5/(G12+G45)≥3.6.

11. The imaging lens as claimed in claim 1, satisfying T5/T4≥1.8, where T4 represents a thickness of said fourth lens element at the optical axis, and T5 represents a thickness of said fifth lens element at the optical axis.

12. The imaging lens as claimed in claim 11, further satisfying T3/(G12+G45)≥1.8, where T3 represents a thickness of said third lens element at the optical axis, G12 represents an air gap length between said first lens element and said second lens element at the optical axis, and G45 represents an air gap length between said fourth lens element and said fifth lens element at the optical axis.

13. The imaging lens as claimed in claim 12, wherein said image-side surface of said fourth lens element has a convex portion in a vicinity of the optical axis.

14. The imaging lens as claimed in claim 11, further satisfying ALT/(G12+G45)≥7.3, where ALT represents a sum of thicknesses of said first lens element, said second lens element, said third lens element, said fourth lens element and said fifth lens element at the optical axis, G12 represents an air gap length between said first lens element and said second lens element at the optical axis, and G45 represents an air gap length between said fourth lens element and said fifth lens element at the optical axis.

15. The imaging lens as claimed in claim 14, wherein said image-side surface of said third lens element has a concave portion in a vicinity of a periphery of said third lens element.

16. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *